United States Patent
Jain et al.

(10) Patent No.: US 12,225,268 B2
(45) Date of Patent: Feb. 11, 2025

(54) METHOD AND SYSTEM FOR FACILITATING CONTENT RECOMMENDATION TO CONTENT VIEWERS

(71) Applicant: Star India Private Limited, Mumbai (IN)

(72) Inventors: Rachit Jain, Mumbai (IN); Shenglong Lyu, Beijing (CN)

(73) Assignee: STAR INDIA PRIVATE LIMITED, Mumbai (IN)

(*) Notice: Subject to any disclaimer, the term of this patent is extended or adjusted under 35 U.S.C. 154(b) by 144 days.

(21) Appl. No.: 18/185,322

(22) Filed: Mar. 16, 2023

(65) Prior Publication Data

US 2023/0328323 A1    Oct. 12, 2023

(30) Foreign Application Priority Data

Mar. 22, 2022   (IN) .............................. 202221015770

(51) Int. Cl.
  *H04N 21/466*   (2011.01)
  *H04N 21/25*    (2011.01)
  *H04N 21/442*   (2011.01)
  *H04N 21/482*   (2011.01)

(52) U.S. Cl.
  CPC ....... *H04N 21/4668* (2013.01); *H04N 21/251* (2013.01); *H04N 21/44204* (2013.01); *H04N 21/4826* (2013.01)

(58) Field of Classification Search
  CPC ............. H04N 21/4668; H04N 21/251; H04N 21/44204; H04N 21/4826
  See application file for complete search history.

(56) References Cited

U.S. PATENT DOCUMENTS

| | | | |
|---|---|---|---|
| 2017/0169018 A1* | 6/2017 | He ................. | G06F 16/24578 |
| 2019/0373331 A1* | 12/2019 | Benzatti ............ | H04N 21/4662 |
| 2020/0007937 A1* | 1/2020 | Polatkan ............ | H04N 21/251 |
| 2021/0409811 A1* | 12/2021 | Sen .................. | H04N 21/2668 |
| 2022/0121698 A1* | 4/2022 | Mehrotra ........... | H04N 21/4532 |

* cited by examiner

*Primary Examiner* — Oschta I Montoya
(74) *Attorney, Agent, or Firm* — Evergreen Valley Law Group; Kanika Radhakrishnan

(57) ABSTRACT

Various embodiments provide a method and a system for facilitating content recommendation to content viewers. The method performed by the system includes accessing content viewer behavior data associated with a content viewer. The method includes classifying the content viewer in a viewer cohort based on the content viewer behavior data. The viewer cohort includes a plurality of related content viewers. The method includes accessing and aggregating content viewer interaction data from the plurality of related content viewers. The content viewer interaction data includes a popularity index. The method includes computing via a machine learning model, a performance metric for each recommended content item based on the content viewer interaction data. The method includes determining an optimal content sequence for displaying the plurality of recommended content items based on the performance metrics for the plurality of recommended content items.

17 Claims, 12 Drawing Sheets

METHOD AND SYSTEM FOR FACILITATING CONTENT RECOMMENDATION TO CONTENT VIEWERS

CROSS REFERENCE TO RELATED APPLICATIONS

This application is entitled to and claims the benefit of the filing date of Indian Provisional Application No. 202221015770, filed on Mar. 22, 2022 in India, the content of which is incorporated herein by reference in its entirety for all purposes.

TECHNICAL FIELD

The present technology generally relates to the delivery of digital content to content viewers and, more particularly, to a method and system for facilitating content recommendation to content viewers.

BACKGROUND

On-demand video streaming as well as live streaming of content has gained popularity in recent times and subscribers are increasingly using a variety of electronic devices to access streaming content. The streaming content is accessed on various electronic devices using Over-The-Top (OTT) media services (i.e. over the Internet).

Typically, content providers offer a large variety of content items, such as movies, web series, documentaries, event live streams, etc., to a content viewer and it is arduous for the content viewer to go through the entire content library to decide which content item to view next. In some cases, a content provider platform may analyze the content viewing history of the content viewer and predict one or more content items that are more likely to engage the content viewer. The content provider platform may then offer one or more content recommendations to the viewer to help the viewer navigate through myriad options of content items offered by the content provider. In one illustrative example, if the content viewer prefers watching movies of a specific genre, such as a crime genre or a thriller genre, then the viewer may be provided with a recommendation of content items belonging to the same genre. For example, 10 different web series based on science/fiction themes may be recommended as relevant for a content viewer based on similarity with a sci-fi web series recently viewed by the content viewer. Each content recommendation may be ranked based on relevance and positioned in a sequence for display based on the respective ranking. However, only a few recommendations may be displayed on the display screen at any given point in time due to screen size limitations and/or to avoid cluttering of thumbnails on the display screen.

Most often, content viewers tend to view only the set of recommended content items displayed on the display screen of the electronic device creating a positional bias. For example, the viewer may select a web series, such as a web series 2. For example among the three most recommended web series currently displayed on the display screen. As such, the sequence of recommended content items may be adapted to indicate that the web series 2 is the most relevant content and the web series 2 may be moved from position 2 to position 1. This positional bias arises due to the fact that the content viewers may not usually prefer to perform an additional cognitive step to explore other recommended content items in the sequence of recommended content items. For example, the content viewer may have to swipe/scroll through the sequence of recommended content items to explore other content items that may interest the content viewer. In one illustrative example, a web series such as a web series 5 may be more interesting to the content viewer as the web series 5 has the same plot but the content viewer may not even scroll to view that content item due to the positional bias.

In light of the foregoing, there is a need to eliminate the positional bias and determine an optimal content sequence for displaying the recommended content items. Further, it would also be advantageous to personalize the recommendations based on viewer preferences so that both viewer engagement levels and content viewer's viewing experience can be improved.

SUMMARY

Various embodiments of the present disclosure methods and systems for facilitating content recommendation to a content viewer.

In an embodiment of the present disclosure, a computer-implemented method is disclosed. The method includes accessing, by a system, content viewer behavior data associated with a content viewer from a database associated with the system. The method further includes classifying, by the system, the content viewer in a viewer cohort from a plurality of viewer cohorts based, at least in part, on the content viewer behavior data. The viewer cohort includes a plurality of related content viewers. The method further includes accessing and aggregating, by the system, content viewer interaction data from the plurality of related content viewers in the viewer cohort. The content viewer interaction data includes a popularity index of each recommended content item from a plurality of recommended content items that is being served on a plurality of electronic devices associated with the plurality of related content viewers by a digital platform server. The method further includes computing, by the system via a machine learning model, a performance metric for each recommended content item of the plurality of recommended content items based, at least in part, on the content viewer interaction data. The method further includes determining, by the system, an optimal content sequence for displaying the plurality of recommended content items based, at least in part, on the performance metrics for the plurality of recommended content items. The optimal content sequence indicates a sequence for displaying each recommended content item of the plurality of recommended content items on an electronic device of the content viewer.

In another embodiment of the present disclosure, a system for facilitating content recommendation to a content viewer. The system includes memory and a processor. The memory stores instructions which are executed by the processor and cause the system to access content viewer behavior data associated with a content viewer from a database associated with the system. The system is further caused to classify the content viewer in a viewer cohort from a plurality of viewer cohorts based, at least in part, on the content viewer behavior data. The viewer cohort includes a plurality of related content viewers. The system is further caused to access and aggregate content viewer interaction data from the plurality of related content viewers in the viewer cohort. The content viewer interaction data includes a popularity index of each recommended content item from a plurality of recommended content items that is being served on a plurality of electronic devices associated with the plurality of related content viewers by a digital platform server. The system is further caused to compute via a machine learning model, a performance metric for each recommended content item of the plurality of recommended content items based, at least in part, on the content viewer interaction data. The system is further caused to determine an optimal content sequence for displaying the plurality of recommended content items based, at least in part, on the performance metrics for the plurality of recommended content items. The optimal content sequence indicates a sequence for displaying each recommended content item of the plurality of recommended content items on an electronic device of the content viewer.

In yet another embodiment of the present disclosure, a non-transitory computer-readable storage medium is disclosed. The non-transitory computer-readable storage medium includes computer-executable instructions that, when executed by at least a processor of a system, cause the system to perform a method. The method includes accessing content viewer behavior data associated with a content viewer from a database associated with the system. The method further includes classifying the content viewer in a viewer cohort from a plurality of viewer cohorts based, at least in part, on the content viewer behavior data. The viewer cohort includes a plurality of related content viewers. The method further includes accessing and aggregating content viewer interaction data from the plurality of related content viewers in the viewer cohort. The content viewer interaction data includes a popularity index of each recommended content item from a plurality of recommended content items that is being served on a plurality of electronic devices associated with the plurality of related content viewers by a digital platform server. The method further includes computing via a machine learning model, a performance metric for each recommended content item of the plurality of recommended content items based, at least in part, on the content viewer interaction data. The method further includes determining an optimal content sequence for displaying the plurality of recommended content items based, at least in part, on the performance metrics for the plurality of recommended content items. The optimal content sequence indicates a sequence for displaying each recommended content item of the plurality of recommended content items on an electronic device of the content viewer.

In yet another embodiment of the present disclosure, another computer-implemented method is disclosed. The method includes accessing, by a system, content viewer behavior data associated with a content viewer from a database associated with the system. Further, the method includes classifying, by the system, the content viewer in a viewer cohort from a plurality of viewer cohorts based, at least in part, on the content viewer behavior data. The viewer cohort includes a plurality of related content viewers. Further, the method includes accessing, by the system, a content library from a digital platform server. The content library includes a plurality of content items. Further, the method includes determining and accessing, by the system, a plurality of recommended content items from the plurality of content items of the content library for the content viewer based, at least in part, on the content viewer behavior data. Further, the method includes computing, by the system via a machine learning model, a performance metric for each recommended content item of the plurality of recommended content items by performing a plurality of operations iteratively for a predefined threshold number of attempts.

The first operation includes facilitating, by the system, a display of at least a set of recommended content items from the plurality of recommended content items on UIs of electronic devices for a plurality of related content viewers. The second operation includes accessing and aggregating, by the system, content viewer interaction data from the plurality of related content viewers in the viewer cohort in relation to the plurality of recommended content items. The content viewer interaction data includes a popularity index of each recommended content item from a plurality of recommended content items that is being served on a plurality of electronic devices associated with the plurality of related content viewers by a digital platform server. The third operation includes computing, by the system, a score for each recommended content item of the plurality of recommended content items based, at least in part, on the viewer interaction data and a scoring policy. The fourth operation includes ranking, by the system, each recommended content item of the plurality of recommended content items based, at least in part, on the score related to the each recommended content item and a ranking policy. The fifth operation includes rearranging, by the system, the plurality of ranked recommended content items at a predefined time interval based, at least in part, on a shuffling policy. The sixth operation includes facilitating, by the system, the display of a plurality of rearranged recommended content items on User Interfaces (UIs) of the plurality of electronic devices associated with the plurality of related content viewers. The seventh operation includes computing and updating, by the system, the content viewer interaction data from the plurality of related content viewers based, at least in part, on monitoring interactions of the plurality of related content viewers with the plurality of rearranged recommended content items.

Further, the method includes determining, by the system, an optimal content sequence for displaying the plurality of recommended content items based, at least in part, on the performance metrics for the plurality of recommended content items. The optimal content sequence indicates a sequence for displaying each recommended content item of the plurality of recommended content items on an electronic device of the content viewer.

BRIEF DESCRIPTION OF THE FIGURES

The advantages and features of the present disclosure will become better understood with reference to the detailed description taken in conjunction with the accompanying drawings, wherein like elements are identified with like symbols, and in which.

Figure 1:
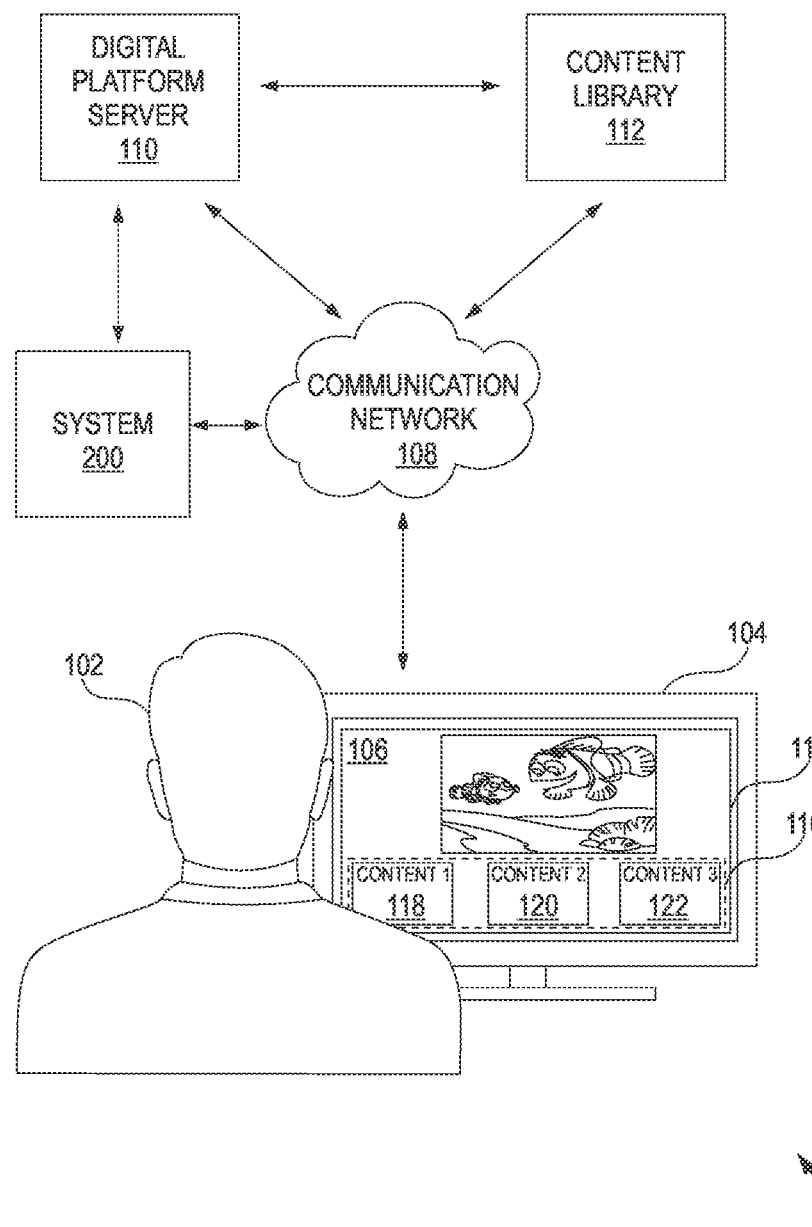
FIG. 1 is an example representation of an environment related to at least some example embodiments of the present disclosure.

The drawings referred to in this description are not to be understood as being drawn to scale except if specifically noted, and such drawings are only exemplary in nature.

DETAILED DESCRIPTION

Overview

Various embodiments of the present disclosure methods and systems for facilitating content recommendation to a content viewer in sequence without any positional bias.

In an embodiment, a system accesses content viewer behavior data associated with a content viewer from a database associated with the system. The system can be implemented within a digital platform server. In one embodiment, historical content viewing data of the content viewer is accessed from a database. Then, the content viewer behavior data associated with the content viewer is determined based, at least in part, on the historical content viewing data. Further, in some scenarios, real-time content viewing data of the content viewer associated with a live-viewing session is accessed from the digital platform server. Then, the content viewer behavior data is dynamically updated based, at least in part, on the real-time content viewing data. It is understood that updating the content viewing data in real-time provides more accurate insights into the content viewer's behavior.

In another embodiment, the content viewer is classified in a viewer cohort from a plurality of viewer cohorts based, at least in part, on the content viewer behavior data. It is understood that classifying the content viewer is predetermined viewer cohorts reduce the commotional resources in determining user category during real-time operation. Further, this classification also reduces the time period in providing content recommendations and reduces latency.

The viewer cohort further includes a plurality of related content viewers. In one embodiment, to generate the plurality of viewer cohorts at first, a set of content viewer behavior data associated with a plurality of content viewers is accessed from the database. Then, a relation metric for the plurality of content viewers is determined based, at least in part, on the set of content viewer behavior data. Herein, the relation metric indicates a content preference of each of the plurality of content viewers. Further, the plurality of viewer cohorts are generated, each of the plurality of viewer cohorts indicating a content category for the plurality of related content viewers with the same content preference. Furthermore, the plurality of content viewers is classified between the plurality of viewer cohorts based, at least in part, on the relation metric, each of the plurality of viewer cohorts comprising the plurality of related content viewers. In another embodiment, phonebook data of the content viewer is accessed from the electronic device of the content viewer. The phonebook data includes a plurality of contacts of the content viewer. Then, upon determining that at least one contact from the plurality of contacts is one of a plurality of related content viewers of the viewer cohort, the score for each recommended content item of the plurality of recommended content items is adjusted based, at least in part, on contact behavior data of the at least one contact, wherein the contact behavior data is accessed from the database.

In another embodiment, content viewer interaction data is accessed and aggregated from the plurality of related content viewers in the viewer cohort. The content viewer interaction data includes a popularity index of each recommended content item from a plurality of recommended content items that is being served on a plurality of electronic devices associated with the plurality of related content viewers by a digital platform server. In one embodiment, the popularity is computed by tracking interaction information related to each of the plurality of related content viewers. Herein, the interaction information includes click-through rates, average view duration, watch history, search terms, comments, ratings, and number of views related to each recommended content item placed at different positions on UIs of the plurality of electronic devices associated with each of the plurality of related content viewers. Then, determine the popularity index of each recommended content item based, at least in part, on interaction information related to each of the plurality of related content viewers. It is understood that determining the viewer interaction data helps to reduce the commotional resources in determining user behavior by relying on a larger data pool. Further, this determination also reduces the time period in providing content recommendations and reduces latency.

In another embodiment, a performance metric for each recommended content item of the plurality of recommended content items is computed via an artificial intelligence machine learning model based, at least in part, on the content viewer interaction data. In an example, the machine learning model is a recursive neural network (RNN) model. Then, an optimal content sequence for displaying the plurality of recommended content items is determined based, at least in part, on the performance metrics for the plurality of recommended content items. Herein, the optimal content sequence indicates a sequence for displaying each recommended content item of the plurality of recommended content items on an electronic device of the content viewer. In one embodiment, computing the performance metric includes performing a plurality of operations iteratively for a predefined threshold number of attempts. The predefined threshold is determined based, at least in part, on the total number of the plurality of recommended content items and a number of recommended content items that can be displayed on a display screen of the electronic device at a given instant. The plurality of operations includes at first, computing a score for each recommended content item of the plurality of recommended content items based, at least in part, on the content viewer interaction data and a scoring policy. Then, ranking each recommended content item of the plurality of recommended content items based, at least in part, on the score related to the each recommended content item and a ranking policy.

Thereafter, rearranging the plurality of ranked recommended content items at a predefined time interval based, at least in part, on a shuffling policy. Further, the display of a plurality of rearranged recommended content items is facilitated on User Interfaces (UIs) of the plurality of electronic devices associated with the plurality of related content viewers. Furthermore, the content viewer interaction data from the plurality of related content viewers is computed and updated based, at least in part, on monitoring interactions of the plurality of related content viewers with the plurality of rearranged recommended content items. It is understood that the optimal content sequence determined through the above process eliminates the positional bias in the recommended content. In one embodiment, a content library of the digital platform server is accessed from the database. The content library includes a plurality of content items. Further, the plurality of recommended content items to be served to the content viewer from the content library is determined based, at least in part, on the content viewer behavior data. It is understood that determining recommended content items based on behavior data provides relevant content recommendations.

The best and other modes for carrying out the present disclosure are presented in terms of the embodiments, herein depicted in FIGS. 1 to 9C. The embodiments are described herein for illustrative purposes and are subject to many variations. It is understood that various omissions and substitutions of equivalents are contemplated as circumstances may suggest or render expedient but are intended to cover the application or implementation without departing from the spirit or scope of the present disclosure. Further, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity, but rather denote the presence of at least one of the referenced items.

FIG. 1 is an example representation 100 of an environment related to at least some example embodiments of the present disclosure. The representation 100 depicts a content viewer 102 controlling or operating an electronic device 104 for viewing/accessing content offered by a streaming content provider.

The term 'streaming content provider' as used herein refers to an entity that holds digital rights associated with digital content present within digital video content libraries, offers the content on a subscription basis by using a digital platform and over-the-top (OTT) media services, i.e., content is streamed over the Internet to the electronic devices of the subscribers. A streaming content provider is hereinafter referred to as a 'content provider' for ease of description. The content offered by the content provider may be embodied as streaming video content such as live streaming content or on-demand video streaming content. It is noted that though the content offered by the content provider is explained with reference to video content, the term 'content' as used hereinafter may not be limited to only video content. Indeed, the term 'content' may refer to any media content including but not limited to 'video content', 'audio content', 'gaming content', 'textual content', and any combination of such content offered in an interactive or non-interactive form. Accordingly, the term 'content' is also interchangeably referred to hereinafter as 'media content' for the purposes of description. Individuals wishing to view/access the media content may subscribe to at least one type of subscription offered by the streaming content provider. A streaming content provider is hereinafter referred to as a 'content provider' for ease of description. Though a content provider is not shown in FIG. 1, a content provider platform in the form of a digital platform server 110, and a content library 112 associated with a content provider are shown in the representation 100 and explained in further detail later.

The content offered by the content provider may be embodied as streaming video content such as live streaming content or on-demand video streaming content. Individuals accessing/viewing the content offered by the content provider are referred to herein as 'content viewer', 'user', 'subscriber', or simply 'a viewer'.

The content viewer 102 may have downloaded a software application (hereinafter referred to as an 'application' or an 'app') corresponding to at least one content provider on the electronic device 104. The content viewer 102 may access the application for various reasons, for example, to watch media content, such as a movie or a web series. The electronic device 104 is depicted to be a Television (TV) for illustration purposes. It is noted that the content viewer 102 may use one or more electronic devices, such as a smartphone, a laptop, a desktop, a personal computer, or any spatial computing device to view the content provided by the content provider. In one illustrative example, the content viewer 102 may access a Web user interface (UI) 106 associated with the application on the electronic device 104. It is understood that the electronic device 104 may be in operative communication with a communication network 108, such as the Internet, enabled by a network provider, also known as an Internet Service Provider (ISP).

The electronic device 104 may connect to the communication network 108 using a wired network, a wireless network, or a combination of wired and wireless networks. Some non-limiting examples of wired networks may include the Ethernet, the Local Area Network (LAN), a fiber-optic network, and the like. Some non-limiting examples of wireless networks may include Wireless LAN (WLAN), cellular networks, Bluetooth or ZigBee networks, and the like.

The electronic device 104 may fetch the Web UI 106 associated with the application over the communication network 108 and cause the display of the Web UI 106 on a display screen 114 of the electronic device 104. In an illustrative example, the content viewer 102 may be watching content (e.g., a movie) and the Web UI 106 may display thumbnails corresponding to a plurality of recommended content items on a sliding widget, shown as a widget bar 116. It shall be noted that the plurality of recommended content items may not only be presented to the content viewer 102 while the content viewer 102 is watching a content playback or when the content viewer 102 has paused the content playback but the plurality of recommended content items may also be displayed to the content viewer 102 after the viewer logs into his/her account via the application or the plurality of recommended content items may be displayed to the content viewer 102 after completion of the content playback.

In at least one example embodiment, the plurality of recommended content items may be predicted based on online viewer behavior. The term 'online viewer behavior' as used herein primarily refers to viewing characteristics or attributes of an individual viewer and may include information related to real-time or historical data related to past content views, reviews provided, trailers watched, and the like. The past content views may be analyzed to determine preferred genres, cast (i.e., actors, actresses, directors, writers, music composers, editors, etc.), languages, plot themes, special effects, and the like. In an embodiment, learning algorithms such as Artificial Intelligence (AI) models or Machine Learning (ML) models may be used to determine the plurality of recommended content items based on content viewer behavior data. Additionally, the plurality of recommended content items may be predicted via AI or ML models based on processing information related to the individual viewer, such as the viewer's name, age, gender, nationality, geographic location, and the like, which is provided as a part of an account creation process with the content provider for availing subscription to the streaming content offered by the content provider. It is noted that at least some of the aforementioned information may also be received from remote data-gathering servers, which track viewer activity on UIs associated with the mobile/web applications associated with the content provider.

In general, the digital platform server 110 predicts a plurality of recommended content items that may interest a particular user such as the content viewer 102 based on the online viewer behavior (i.e., past choices, preferences, etc.), viewer personal information, and the content provider's catalog obtained from the content library 112. It is noted that the content library 112 usually stores a plurality of content items related to a wide variety of media content such as entertainment content, factual content, educational content, gaming content, lifestyle content, fitness content, travel content, and the like.

The digital platform server 110 is configured to be in operative communication with the content library 112 to access metadata related to the content items. For example, in the case of movie content, the metadata may include information related to the duration of the movie, release date of the movie, the cast of the movie, language, watch history, movie genre, average movie rating provided by viewers on popular rating sites, etc. Additionally, the metadata may also include at least one of a synopsis of the movie (i.e., a brief story outline), and a brief description of the role(s) of one or more main characters associated with the content. Similarly, the metadata for gaming content may include details related to the creator of the game, information related to graphics card support needed in the user's electronic device, the number of players or teams that can participate in the game, the number of levels to unlock, and the like.

The digital platform server 110 may perform a lookup on the metadata of different content items to identify content items, which may serve as content recommendations to the content viewer 102. In particular, the digital platform server 110 determines the plurality of recommended content items to be served to the content viewer from the content library based, at least in part, on the content viewer behavior data. More specifically, the digital platform server 110 may compare the online viewer behavior with the metadata to identify content items that may interest the content viewer 102. In one illustrative example, if the content viewer 102 has watched two documentaries such as, 'A PANDEMIC THAT RAVAGED THE WORLD' and 'HOW COVID TOOK THE WORLD BY STORM', the digital platform server 110 may look up metadata in the content library 112 for relevant documentaries on survivors of a pandemic or how the pandemic changed the world. In another illustrative example, the online viewer behavior of the content viewer 102 may indicate that the content viewer 102 prefers action thrillers and the viewer usually watches all movies performed by a specific actor, for example, Johnny Depp. In such cases, the digital platform server 110 may identify content items with the same genre and/or cast, such as for example, generic content with Johnny Depp in a lead role, action thriller content with Johnny Depp as one of the lead cast, and action thriller content popular among most content viewers. Such identified content items may be selected as content recommendations for the content viewer 102. Moreover, such identified content items may be collated along with other recently popular content items viewed by viewers sharing similar profiles (i.e., the plurality of related content viewers) as the content viewer to configure the plurality of recommended content items.

The plurality of recommended content items may be scored based on different parameters/factors, such as click-through rates, number of views, watch time, relevancy, similarity, and the like. Thereafter, the plurality of recommended content items is ranked based on their scores, for example from a maximum score to a minimum score to determine a sequence of thumbnails corresponding to the plurality of recommended content items to be displayed (in the order of rank) on the display screen 114 of the electronic device 104. The sequence of thumbnails corresponding to the plurality of recommended content items is hereinafter referred to as the 'sequence of recommended content items'.

The sequence of recommended content items may be displayed to the content viewer 102 as a list on the widget bar 116. However, the immediate UI on the display screen 114 of the electronic device 104 may be capable of displaying only a few content items from among the sequence of recommended content items. As shown in FIG. 1, only thumbnails of recommended content items like thumbnail 118 (shown as 'CONTENT 1'), thumbnail 120 (shown as 'CONTENT 2'), and thumbnail 122 (shown as 'CONTENT 3') may be displayed to the content viewer 102. Most often, the content viewer 102 may tend to select the next content item to watch from the three content items 118, 120, and 122 displayed on the display screen 114 of the electronic device 104. The selection of the thumbnails of only those content items which are displayed on the display screen 114 as recommendations leads to reinforcing their relevance and creates a positional bias as the other recommended content items, such as CONTENT 4, CONTENT 5, and CONTENT 6, which may be present on the widget bar 116 as part of the sequence of recommended content items, but not displayed on the display screen 114 may not be viewed by the content viewer 102. This positional bias arises due to the fact that the content viewers may not usually prefer to perform an additional cognitive step to explore other recommended content items in the sequence of recommended content items. For example, the content viewer may have to swipe/scroll through the sequence of recommended content items or click on a 'More' button to explore other content items that may interest the content viewer. However, the viewer often chooses to view content from the content titles displayed on the display screen, which creates positional bias and does not provide a fair chance for the other recommended content items in the sequence of recommended content items.

To overcome the aforementioned drawbacks and provide additional advantages, a system 200 is provided for facilitating content recommendation to content viewers. The system 200 is configured to receive content viewer interaction data corresponding to a plurality of related content viewers in a viewer cohort (i.e. grouping of content viewers similar to the content viewer 102) from a plurality of viewer cohorts in relation to placing each recommended content item at different positions within the sequence of recommended content items. The system 200 also receives online viewer behavior related to the content viewers in the form of content viewer behavior data. The system 200 is configured to determine an optimal content sequence for the plurality of recommended content items based on the content viewer interaction data and the online viewer behavior. To that end, the optimal content sequence is customized to a viewer profile or a similar viewer profile. The optimal content sequence for the plurality of recommended content items is configured to engage a content viewer (such as content viewer 102) and enhance a viewing experience for the content viewer 102. In addition, the system 200 is configured to suggest/recommend content items to the viewer based on contacts (i.e., acquaintances) viewing similar content via the application provided by the content provider. The system 200 is explained in further detail with reference to FIG. 2.

Figure 2:
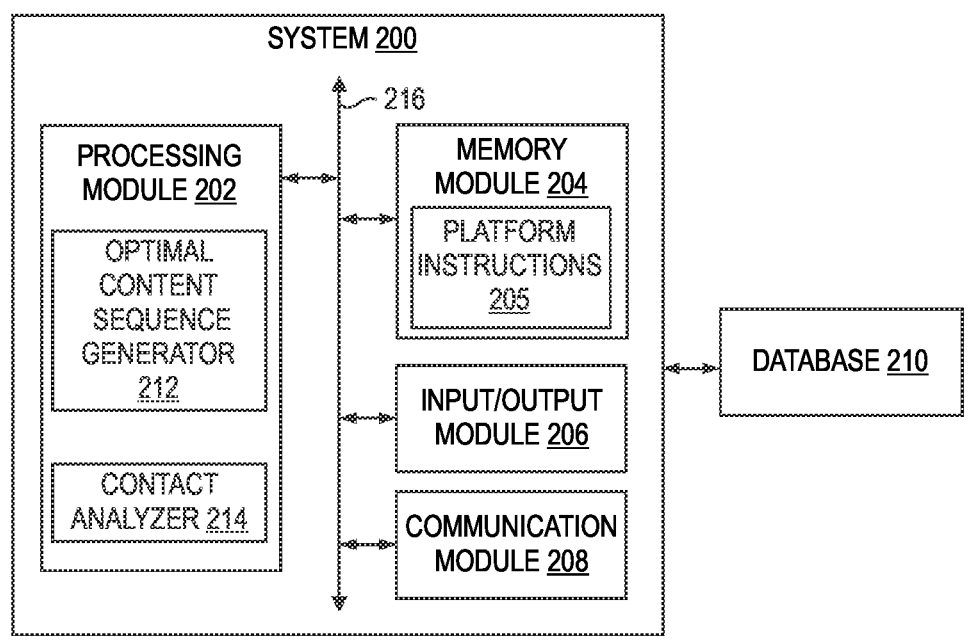
FIG. 2 is a block diagram of the system configured to facilitate content recommendation to content viewers, in accordance with an embodiment of the present disclosure.

FIG. 2 is a block diagram of the system 200 configured to facilitate content recommendation to content viewers, in accordance with an embodiment of the present disclosure. The term 'facilitating content recommendation' as used herein primarily implies assisting a content provider platform, such as the digital platform server 110 shown in FIG. 1, in providing content recommendations to content viewers in a manner that the sequence of recommended content items is devoid of any positional bias, and moreover personalized based on viewer preferences such that both viewer engagement levels and viewer's viewing experience are improved.

In at least one embodiment, the system 200 may be implemented in one or more computing devices as part of a server entity and may be in operative communication with the digital platform server 110 (shown in FIG. 1). Alternatively, the system 200 may be included within the digital platform server 110.

The system 200 is depicted to include a processing module 202, a memory module 204, an input/output (I/O) module 206, and a communication module 208. It is noted that although the system 200 is depicted to include the processing module 202, the memory module 204, the I/O module 206, and the communication module 208, in some embodiments, the system 200 may include more or fewer components than those depicted herein. The various components of the system 200 may be implemented using hardware, software, firmware, or any combinations thereof. It is also noted that one or more components of the system 200 may be implemented in a single server or a plurality of servers, which are remotely placed from each other.

In one embodiment, the processing module 202 may be embodied as a multi-core processor, a single-core processor, or a combination of one or more multi-core processors and one or more single-core processors. For example, the processing module 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In one embodiment, the memory module 204 is capable of storing machine-executable instructions, referred to herein as platform instructions 205. Further, the processing module 202 is capable of executing the platform instructions 205. In an embodiment, the processing module 202 may be configured to execute hard-coded functionality. In an embodiment, the processing module 202 is embodied as an executor of software instructions, wherein the instructions may specifically configure the processing module 202 to perform the algorithms and/or operations described herein when the instructions are executed. The processing module 202 is further depicted to include an optimal content sequence generator 212 and a contact analyzer 214. The optimal content sequence generator 212 and the contact analyzer 214 are explained in further detail later.

The memory module 204 may be embodied as one or more volatile memory devices, one or more non-volatile memory devices, and/or a combination of one or more volatile memory devices and non-volatile memory devices. For example, the memory module 204 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read-only memory), CD-R (compact disc recordable), CD-R/W (compact disc rewritable), DVD (Digital Versatile Disc) and BD (BLU-RAY® Disc).

In at least some embodiments, the memory module 204 stores logic and/or instructions, which may be used by modules of the processing module 202, such as the optimal content sequence generator 212 and the contact analyzer 214. For example, the memory module 204 includes instructions for (1) accessing and aggregating content viewer interaction data from the plurality of related content viewers in the viewer cohort in relation to a plurality of recommended content items displayed on UIs of respective electronic devices of the plurality of related content viewers for a predefined time, (2) computing a performance metric for each recommended content item of the plurality of recommended content items based, at least in part, on the content viewer interaction data, (3) computing a score for each recommended content item of the plurality of recommended content items based, at least in part, on the viewer interaction data and a scoring policy, (4) ranking each recommended content item of the plurality of recommended content items based, at least in part, on the score related to the each recommended content item and a ranking policy, (5) rearranging or shuffling the plurality of ranked recommended content items at a predefined time interval based, at least in part, on a shuffling policy, (6) facilitating the display of a plurality of rearranged recommended content items on User Interfaces (UIs) of the plurality of electronic devices associated with the plurality of related content viewers, (7) computing and updating the content viewer interaction data from the plurality of related content viewers based, at least in part, on monitoring interactions of the plurality of related content viewers with the plurality of rearranged recommended content items, and (8) determining an optimal content sequence for displaying the plurality of recommended content items based, at least in part, on the performance metrics for the plurality of recommended content items. In other words, the performance of each recommended content item is evaluated at different positions to determine an optimal content sequence for the plurality of recommended content items.

The memory module 204 further includes logic and/or instructions for: (1) accessing content viewer behavior data associated with a content viewer from a database (such as database 210) associated with the system 200, (2) classifying the content viewer in a viewer cohort from a plurality of viewer cohorts based, at least in part, on the content viewer behavior data, the viewer cohort including a plurality of related content viewers, and (3) recommending content items in an optimal content sequence based on the identified cohort. Furthermore the memory module 204 includes instructions for: (1) accessing phonebook data of the content viewer from the electronic device of the content viewer, the phonebook data including a plurality of contacts of the content viewer (i.e., contact information), (2) analyzing contact information from a phonebook of the content viewer to identify at least one contact (or one or more acquaintances) from the plurality of contacts is a subscriber of the content provider, (3) determining that the at least one contact is one of a plurality of related content viewers of the viewer cohort, (4) adjusting the score for each recommended content item of the plurality of recommended content items based, at least in part, on contact behavior data of the at least one contact, wherein the contact behavior data is accessed from the database, and (5) recommending content items to the content viewer based on similar content accessed from the content provider by the at least one contact (or one or more acquaintances). More specifically, the content item that the acquaintances felt optimal from a sequence of recommended content items (i.e., a recommendation list) presented to them may be considered as 'similar content' fit for recommendations to the content viewer.

In an embodiment, the I/O module 206 may include mechanisms configured to receive inputs from and provide outputs to the operator of the system 200. The term 'operator of the system 200' as used herein may refer to one or more individuals, whether directly or indirectly, associated with managing the digital platform server 110, such as an OTT platform on behalf of the content provider. To enable the reception of inputs and provide outputs to the system 200, the I/O module 206 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light-emitting diode display, a thin-film transistor (TFT) display, a liquid crystal display, an active-matrix organic light-emitting diode (AMOLED) display, a microphone, a speaker, a ringer, and the like.

In an example embodiment, at least one module of the system 200 may include I/O circuitry (not shown in FIG. 2) configured to control at least some functions of one or more elements of the I/O module 206, such as, for example, a speaker, a microphone, a display, and/or the like. The module of the system 200 and/or the I/O circuitry may be configured to control one or more functions of the one or more elements of the I/O module 206 through computer program instructions, for example, software and/or firmware, stored on a memory, for example, the memory module 204, and/or the like, accessible to the processing module 202 of the system 200.

The communication module 208 may include communication circuitry such as for example, a transceiver circuitry including antenna and other communication media interfaces to connect to a communication network, such as the communication network 108 shown in FIG. 1. The communication circuitry may, in at least some example embodiments enable reception of: (1) content viewer behavior data associated with a content viewer from a database associated with the system 200, (2) content viewer interaction data from the plurality of related content viewers in the viewer cohort, (3) phonebook data of the content viewer from the electronic device of the content viewer, (4) historical content viewing data of the content viewer from the database, (5) real-time content viewing data of the content viewer associated with a live-viewing session from remote servers tracking user activity or from the digital platform server 110 (shown in FIG. 1), (6) a set of content viewer behavior data associated with a plurality of content viewers from the database, and (7) content library of the digital platform server from the database. The communication circuitry may further be configured to enable transmission of the plurality of recommended content items in an optimal content sequence to electronic devices associated with the content viewers (e.g., the content viewer 102). In an embodiment, communication circuitry may be further configured to facilitate the display of a plurality of rearranged recommended content items on User Interfaces (UIs) of the plurality of electronic devices associated with the plurality of related content viewers including the content viewer 102.

The system 200 is further depicted to be in operative communication with a database 210. The database 210 is any computer-operated hardware suitable for storing and/or retrieving data. In one embodiment, the database 210 stores viewer profiles of a plurality of viewers registered with the content provider. Further, the database 210 also includes a plurality of rules for scoring and ranking recommended content items in a content sequence. The database 210 may also include a plurality of shuffling rules, which are configured to rearrange the plurality of recommended content items in different content sequences based on the content viewer interaction data. The database is further configured to store learning algorithms such as one or more AI or ML models. In an example, the machine learning model may be a recursive neural network model.

The database 210 may include multiple storage units such as hard drives and/or solid-state drives in a redundant array of inexpensive disks (RAID) configuration. In some embodiments, the database 210 may include a storage area network (SAN) and/or a network attached storage (NAS) system. In one embodiment, the database 210 may correspond to a distributed storage system, wherein individual databases are configured to store custom information, such as content viewer interaction data logs for various streaming content items.

In some embodiments, the processing module 202 and/or other components of the processing module 202 may access the database 210 using a storage interface (not shown in FIG. 2). The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processing module 202 and/or the modules of the processing module 202 with access to the database 210.

The various components of the system 200, such as the processing module 202, the memory module 204, the I/O module 206, and the communication module 208 are configured to communicate with each other via or through a centralized circuit system 216. The centralized circuit system 216 may be various devices configured to, among other things, provide or enable communication between the components of the system 200. In certain embodiments, the centralized circuit system 216 may be a central printed circuit board (PCB) such as a motherboard, a main board, a system board, or a logic board. The centralized circuit system 216 may also, or alternatively, include other printed circuit assemblies (PCAs) or communication channel media.

In an embodiment, the communication module 208 is configured to receive a plurality of recommended content items from the digital platform server 110. As already explained with reference to FIG. 1, the plurality of recommended content items are predicted based, at least in part, on the historical data of the viewer (i.e., the online viewer behavior). In particular, at first, content viewer behavior data associated with a content viewer is accessed from a database associated with the system. Then, the content viewer is classified into a viewer cohort from a plurality of viewer cohorts based, at least in part, on the content viewer behavior data. Then, a content library is accessed from the digital platform server 110. The content library includes a plurality of content items. Further, a plurality of recommended content items from the plurality of content items of the content library for the content viewer based, at least in part, on the content viewer behavior data. More specifically, the digital platform server 110 or system 200 accesses and analyses historical content viewing data of the content viewer from the database to determine the content viewer behavior data associated with the content viewer. Then, it further determines the plurality of recommended content items that may actively engage the viewer based on the content viewer behavior data. In another scenario, the digital platform server 110 or system 200 accesses and analyses real-time content viewing data of the content viewer associated with a live-viewing session to dynamically update the content viewer behavior data and further, determine the plurality of recommended content items.

It is understood that, the determination of the content viewer behavior data is done via a second machine learning model based, at least in part, on the historical content viewing data. It is noted that content viewer behaviour contains various and highly correlated patterns, these relations can be extracted by a RNN based machine learning model from the historical content viewing data. Further, there are large scale of latent observation patterns hidden in the non-click queries can also be determined.

In one illustrative example, the viewer may have viewed an animation movie 'Finding Nemo®'. Accordingly, the content recommended for the viewer may include movies arranged in a sequence, for example, Finding Dory®, Ratatouille®, Zootopia®, The Good Dinosaur®, and Monsters Inc. R. It shall be noted that all these recommended content items (i.e., movies) may be determined based on evaluating the metadata of the movie, such as genre, plot, visual effects, and the like for their relevancy.

In at least one example embodiment, the communication module 208 is also configured to receive content viewer interaction data in relation to each recommended content item from electronic devices of the plurality of related content viewers watching recommended content items provided by the content provider. In an embodiment, the content viewer interaction data includes a popularity index of each recommended content item from a plurality of recommended content items that are being served on a plurality of electronic devices associated with the plurality of related content viewers. In an embodiment, the popularity index is determined based, at least in part, on interaction information related to each of the plurality of related content viewers. In various non-limiting examples, the interaction information is tracked by the system 200 and includes information related to at least click-through rates, average view duration, watch history, search terms, comments, ratings, number of views related to each recommended content item placed at different positions on UIs of the plurality of electronic devices associated with each of the plurality of related content viewers and the like. More specifically, content viewer interaction data in relation to placing each recommended content item in a specific position is collated over a predefined time period 'T'. For example, content 1 is placed at position 1 and the content viewer interaction data is received for a predefined time (e.g., 5 hours) and then the content 1 may be moved to position 5 for another predefined time period 'T' and content viewer interaction data may be collated for that position (i.e., position 5). More specifically, a position of each content item (i.e., content 1) is shuffled from say position 1 to position 10 (in a list of 10 or more content items) for a predefined period of time and the content viewer interaction data at each position is recorded. The content viewer interaction data indicates a popularity or demand (i.e., through the popularity index) for the recommended content item (i.e., content 1) among the plurality of recommended content items for the plurality of related content viewers accessing content on the digital platform server 110.

In at least some example embodiments, a sequence of recommended content items may be adapted, i.e., shuffled to identify the receptiveness of a recommended content item by the content viewers at each position. The parameters for determining the relevancy of a recommended content item, such as click-through rates, average view duration, watch history, search terms, comments, ratings, and a number of views related to each content item may vary at each position. For example, the click-through rate for the content 1 at position 1, for example, the first content item in a sequence of 5 content items is different from the click-through rate it may receive when placed as the fifth content item in the sequence of recommended content items due to the positional bias. Such content viewer inputs in relation to each recommended content item at a position may be captured as content viewer interaction data and received by the communication module 208 of the system 200. In some embodiments, the number of views may also vary when each recommended content item is placed in a specific position. For example, the number of views when the recommended content (i.e., movie X) appears as the first content item (i.e., position 1 in a sequence of 5 movies) in the content sequence is different from the number of views the movie X would garner when placed as the fifth content item (i.e., position 5 in a sequence of 5 movies). Such interaction information may also be captured and provided to the communication module 208 as content viewer interaction data. The plurality of recommended content items and the content viewer interaction data are forwarded to the optimal content sequence generator 212 of the processing module 202. The processing of the content viewer interaction data and the plurality of recommended content items to determine an optimal content sequence of recommended content items is explained hereinafter with reference to FIG. 3.

Figure 3:
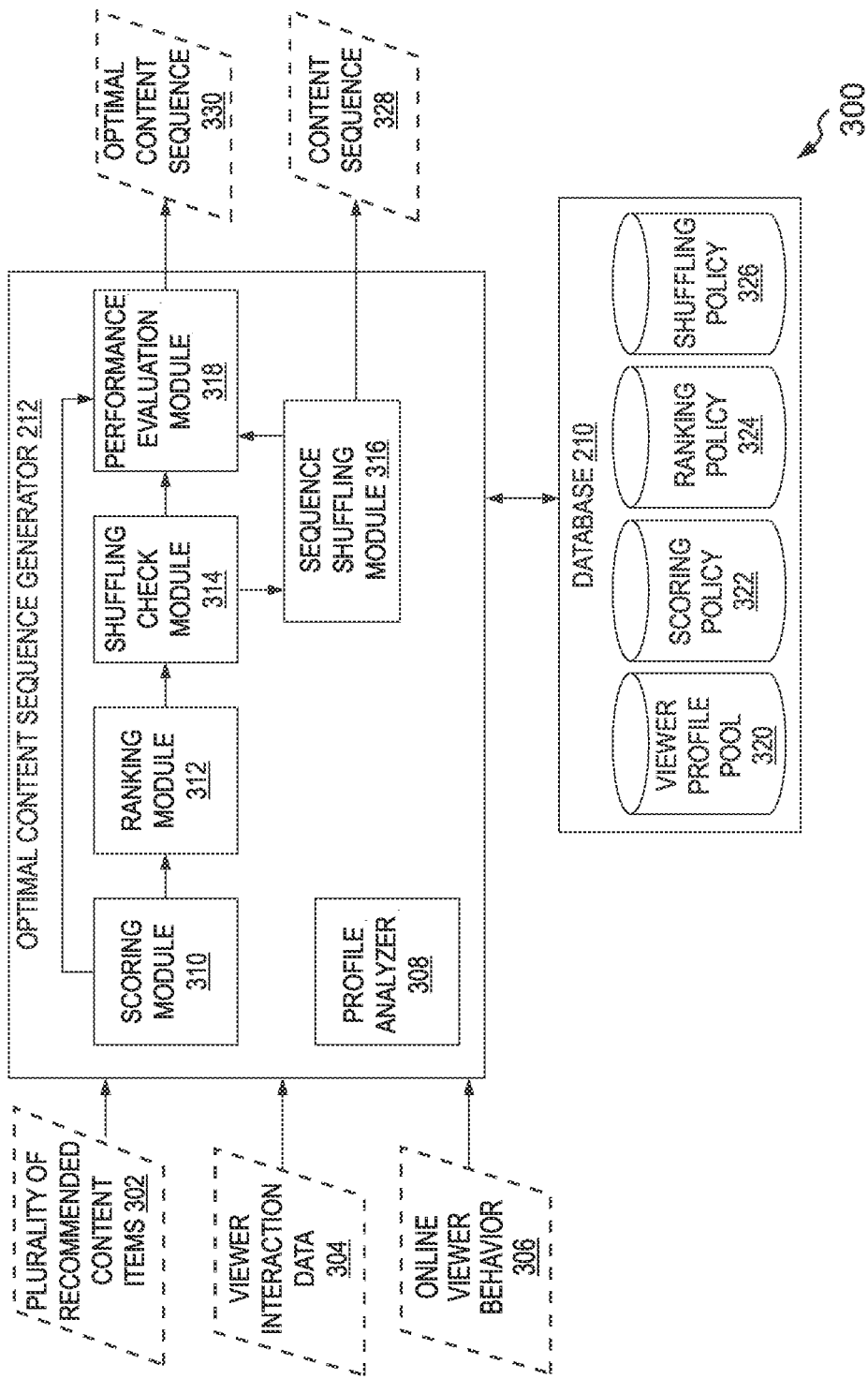
FIG. 3 is a block diagram of the optimal content sequence generator of FIG. 2 for illustrating the processing of content viewer interaction data related to a plurality of recommended content items to determine an optimal content sequence of recommended content items for content viewers, in accordance with an embodiment of the present disclosure.

FIG. 3 is a block diagram 300 of the optimal content sequence generator 212 of FIG. 2 for illustrating the processing of content viewer interaction data 304 related to a plurality of recommended content items 302 to determine an optimal content sequence of recommended content items 330 for content viewers, in accordance with an embodiment of the present disclosure. The optimal content sequence of recommended content items 330 is hereinafter referred to as the optimal content sequence 330.

The term 'optimal content sequence' as used herein refers to an arrangement of the plurality of recommended content items that ensure the content viewers get to view the most appropriate or relevant recommended content items in the first position and the relevancy decreases as the viewer scrolls/swipes through the entire list of recommended content items on the sliding widget, such as the sliding widget 116 shown in FIG. 1. More specifically, the optimal content sequence defines an optimal position for each recommended content item of the plurality of recommended content items based on the content viewer interaction data i.e., how the recommended content item is received at a position. In one illustrative example, if a sequence of recommended content items is depicted as drama 1, drama 2, drama 3, drama 4, and drama 5, the optimal content sequence 330 may be adapted to depict drama 3, drama 2, drama 5, drama 1 and drama 4 based on the content viewer interaction data 304.

In one embodiment, the communication module 208 of the system 200 may receive the plurality of recommended content items 302 from the digital platform server 110 and the content viewer interaction data 304 from a plurality of related content viewers. The communication module 208 is configured to forward the received information (i.e., the content viewer interaction data 304 and the plurality of recommended content items 302) to the processing module 202 (shown in FIG. 2). Further, the optimal content sequence generator 212 of the processing module 202 is configured to receive this information. Accordingly, in FIG. 3, the optimal content sequence generator 212 is depicted to receive the content viewer interaction data 304 (including the popularity metric described earlier) and the plurality of recommended content items 302 as inputs.

The optimal content sequence generator 212 in conjunction with the instructions stored in the memory module 204 may be configured to evaluate the performance of each recommended content item from among the plurality of recommended content items 302 at different positions in a content sequence to determine the optimal content sequence 330. To that effect, scores of each recommended content item at different positions may be analyzed based on the content viewer interaction data 304 received in relation to each recommended content item which is explained in detail hereinafter.

The optimal content sequence generator 212 includes a profile analyzer 308. In at least one example embodiment, the communication module 208 of the system 200 is configured to receive online viewer behavior 306 related to a plurality of viewers from respective electronic devices of the viewers. In other words, a set of content viewer behavior data associated with a plurality of content viewers is accessed from the database 210. The plurality of related content viewers may be identified from a viewer profile pool 320 stored in the database 210. The online viewer behavior 306 may refer to viewer activity on the application, such as historical data related to past content views (e.g., cast, genre, theme, type of music, etc.), day/time of viewing content, reviews provided, trailers watched, and the like or real-time content viewing data. Additionally, the online viewer behavior 306 may also include personal information of the user such as, name, age, gender, nationality, geographic location, content preference, and the like provided as a part of account creation with the content provider. At least a part of such information may also be received from remote data-gathering servers tracking viewer activity. The online viewer behavior 306 may be forwarded to the profile analyser 308.

In some example embodiments, the profile analyzer 308 in conjunction with the instructions of the memory module 204 is configured to process the online viewer behavior 306 of each viewer in the viewer profile pool 320 to assign the viewer to a cohort. In particular, a relation metric is determined for the plurality of content viewers based, at least in part, on the set of content viewer behavior data. In an example, the relation metric indicates a content preference of each of the plurality of content viewers. Further, the profile analyzer 308 generates a plurality of viewer cohorts such that each of the plurality of viewer cohorts indicates a content category for the plurality of related content viewers with the same content preference. Furthermore, the profile analyzer 308 classifies the plurality of content viewers between the plurality of viewer cohorts based, at least in part, on the relation metric, each of the plurality of viewer cohorts including the plurality of related content viewers. Thereafter, different content items may be recommended to the different cohorts of related content viewers based on the online viewer behavior corresponding to that cohort. The term 'cohort' as used herein refers to a group of viewers accessing the same or similar streaming content on respective devices at the same time period/geographical location and share the same or similar online viewer behavior for example, requested media content, gender, age group, network provider, etc. For example, the plurality of related content viewers within each cohort may prefer or appreciate certain content (e.g., movie plot or cast) that is determined based on the online viewer behavior 306 received in relation to each viewer. Moreover, the plurality of recommended content items 302 for each cohort may be arranged in the optimal content sequence 330 determined by the performance evaluation module 318 as will be explained in further detail.

In one illustrative example, content viewers in the age group of 18-25 from a particular region (e.g., city A) prefer to binge-watch crime thrillers in a regional language and such content viewers can be termed as related content viewers and can further be classified within a particular viewer cohort. This cohort is usually recommended the same content and the plurality of recommended content items 302 are displayed in the same optimal content sequence for all the related content viewers in a cohort. It shall be noted that the viewer may be re-assigned to a different cohort if changes are observed in the online viewer behavior 306 and content may be tailored based on the preferences of the viewer. Such categorization of viewers into cohorts and providing the same optimal content sequence 330 for all the viewers of the cohort saves computational resources and processing speeds while recommending content for the content viewers based on preferences.

Further, the optimal content sequence generator 212 includes a scoring module 310, a ranking module 312, a shuffling check module 314, a sequence shuffling module 316, and a performance evaluation module 318. The scoring module 310 in conjunction with a scoring policy 322 stored in the database 210 is configured to provide a score for each recommended content item. The scoring policy 322 may include rules to assign scores to the recommended content items based on different parameters/factors, such as click-through rates, number of views, watch time, relevancy or similarity based on attributes (e.g., cast, content genre, plot, etc.) and the like. In an embodiment, the learning algorithm such as an AI or ML model to determine the scores using the scoring policy 322. To that end, the scoring module 310 is configured to compute a score for each recommended content item of the plurality of recommended content items based, at least in part, on the content viewer interaction data via a machine learning model. In a non-limiting example, the machine learning model is a Recursive Neural Network (RNN) model. In one example embodiment, the machine learning model employs a relative weight value assignment technique in which a recommended content item with the highest click through rates is assigned a maximum weight value (i.e., a maximum score) and the content item with least click-through rates is assigned a minimum weight value (i.e., a minimum score). In one illustrative example, movie 1 may have a click-through rate of 12%, movie 2 may have a click-through rate of 9%, movie 3 may have a click-through rate of 5%, movie 4 may have a click-through rate of 8% and movie 5 may have a click-through rate of 6% in a content sequence of 5 movies displayed to a cohort of viewers on respective electronic devices. Similarly, other factors such as relevancy, the number of views for each movie, watch time of each movie, or similarity with a viewer (or a cohort of viewers) based on attributes such as cast, content genre, plot, etc. may be aggregated and each movie may be assigned with weight values. In a simplified example, based on the click-through rate, the movie 1 may be assigned a weight value of 0.4, the movie 2 may be assigned a weight value of 0.3, the movie 3 may be assigned a weight value of 0.06, the movie 4 may be assigned with a weight value of 0.2 and the movie 5 may be assigned with a weight value of 0.04. It is noted that although only a few factors are mentioned herein, other relevant factors such as ratings of the recommended content items, reviews on popular social media sites, number of times a title related to the content item was searched, and the like, may be used to determine a score for each recommended content. The scores for the plurality of recommended content items are forwarded to the ranking module 312. An equation for computing the score by the machine learning model is depicted by equation 1 given below:

$$P(r_i = 1 \mid x) \doteq P(c_i = 1 \mid o_i = 1; x) = \frac{P(c_i = 1 \mid x)}{P(o_i = 1 \mid x)} \quad \text{Equation 1}$$

Herein, P indicates the probability (i.e., the weight), $r_i$ is the $i^{th}$ relevance information, x is the feature vector, $c_i$ is the $i^{th}$ click through information, $o_i$ is observed information. Further, $P(r_i=1|x)$ indicates the probability of a content item being relevant (ranking score) and indicates $P(c_i=1|x)$ the probability of a content item being clicked. It is noted that the term 'observed information' refers to information pertaining to an item that was previously impressed upon by the content viewer. The observed significance is given by $P(o_i=1)$ and it enables the model to debias the impact of position.

Another equation for computing the probability (i.e., the weight) based on click through information is depicted by equation 2 given below:

$$p_i = P(c_i=1) = P(z=i) \quad \text{Equation 2}$$

Herein, $p_i$ is the click probability and z is the index of clicked position.

Another equation for computing the probability (i.e., the weight) based on relevance information is depicted by equation 3 given below:

$$h_i = P(z=i \mid z \geq i, x; \theta) = f_\theta(x_i \mid b_{i-1}) \quad \text{Equation 3}$$

Herein, $h_i$ is the relevance probability.

The ranking module 312 in conjunction with a ranking policy 324 stored in the database 210 is configured to assign a rank for each recommended content item based on corresponding scores. In general, the ranking of a recommended content item enables the assignment of a position for the recommended content item in a sequence of recommended content items. In other words, the ranking of the recommended content items generates a content sequence 328 of the recommended content items that indicates an order in which the recommended content items will be displayed for the content viewer on the display screen of an electronic device, such as the electronic device 104 shown in FIG. 1. An example display of recommended content items in a content sequence on the display screen of the electronic device is shown and explained with reference to FIG. 4.

Figure 4:
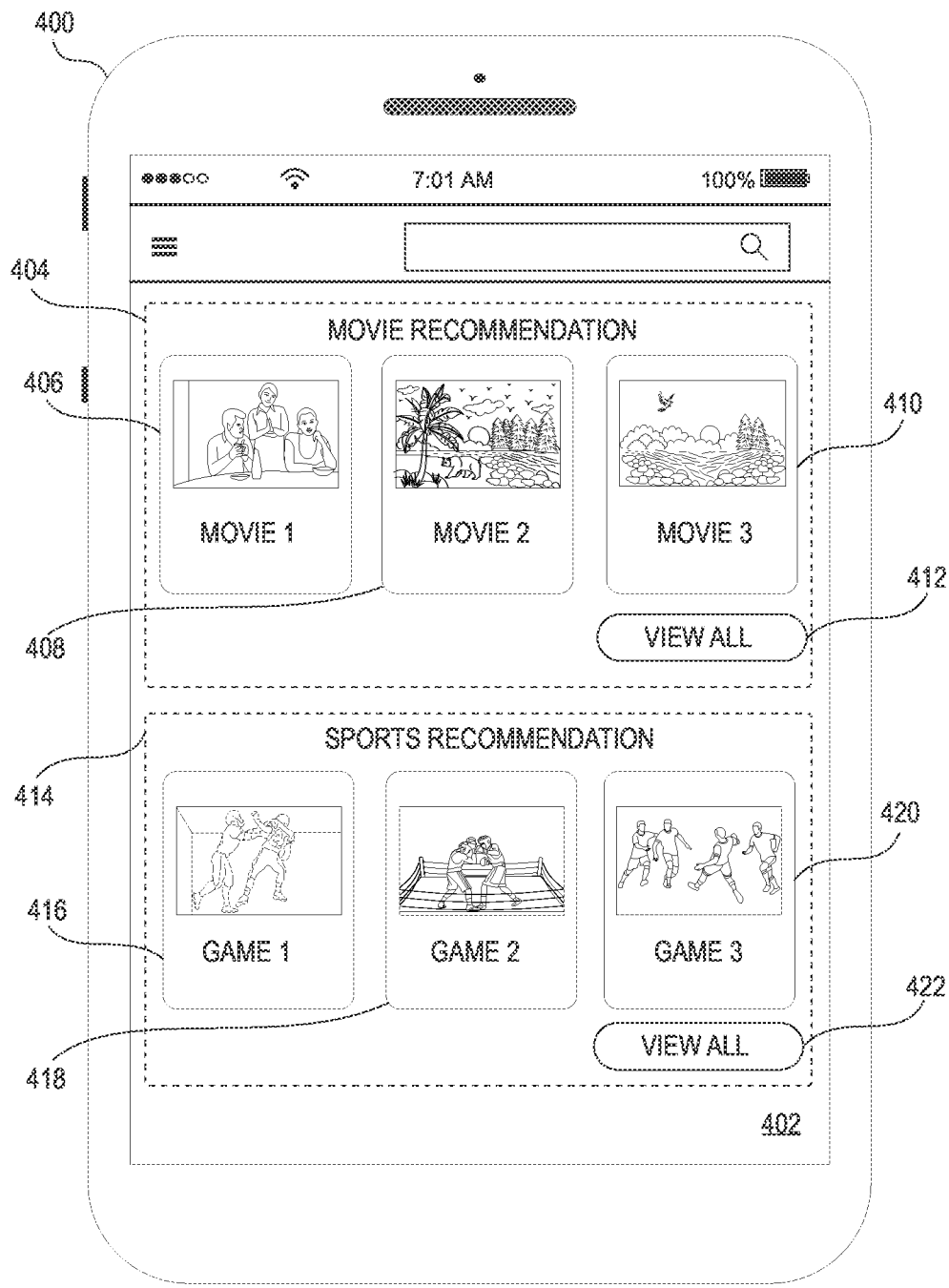
FIG. 4 shows an electronic device displaying a UI recommending content items to a content viewer, in accordance with an embodiment of the present disclosure.

Referring now to FIG. 4, an electronic device 400 displaying a UI 402 recommending content items to a content viewer is shown, in accordance with an embodiment of the present disclosure. The UI 402 may correspond to a home page of an application corresponding to a content provider. It is noted that the content recommendations may be provided not only on the home page but also on pausing content playback or on completion of the content playback. Further, as explained with reference to FIG. 1, the digital platform server 110 may determine a plurality of recommended content items based at least on historical viewer behavior or real-time content viewer behavior (i.e., online viewer behavior) while accessing content using the application provided by the content provider. In particular, at first, a content library including a plurality of content items of the digital platform server 110 from the database 210. Then, the plurality of recommended content items to be served to the content viewer from the content library can be determined based, at least in part, on the content viewer behavior data.

In this example representation, when a viewer for example, the content viewer 102 shown in FIG. 1, logs into his account using account credentials, the UI 402 (i.e., the home page) may be displayed to the viewer after authenticating the account credentials. The UI 402 is configured to display a plurality of recommended content items based, at least in part, on the online viewer behavior. The recommended content items may be segregated into one or more different sections based on respective content types such as, for example, a movie content section, a sports content section, a TV content section, a language content section, and the like. The UI 402 is exemplarily depicted to display two sections, such as a section 404 and a section 414, associated with text 'MOVIE RECOMMENDATION', 'SPORTS RECOMMENDATION', respectively. Each section is associated with a set of recommended content items. For example, the section 404 is depicted to display three thumbnails 406, 408, and 410 associated with three content items, which are associated with content titles 'MOVIE 1', 'MOVIE 2', and 'MOVIE 3', respectively. Similarly, the section 414 is depicted to display three thumbnails 416, 418, and 420 associated with content items, which are associated with content titles 'GAME 1', 'GAME 2', and 'GAME 3', respectively.

It is noted that only three recommended content items are shown in each section in the UI 402 for illustration purposes, and it is understood that the viewer may have to swipe to the right to view the entire sequence of recommended movies in the section 404 or click on the tab 412, which is associated with text 'VIEW ALL'. A selection input on the tab 412 is configured to cause a display of the sequence of recommended content items, such as MOVIE 1, MOVIE 2, MOVIE, 3, MOVIE 4, MOVIE 5, and MOVIE 6, for the section 404. Similarly, a selection input on the tab 422, which is associated with the text 'VIEW ALL', is configured to cause a display of the sequence of recommended content items, such as GAME 1, GAME 2, GAME, 3, GAME 4, GAME 5, and GAME 6, for the section 414.

In at least some embodiments, viewers tend to click/select on any such recommended content item and view the content for a duration. Such selections provided by the content viewer and watch duration over a predefined time are captured by the application of the content provider as 'content viewer interaction data' (shown as content viewer interaction data 304 in FIG. 3) and provided to the system 200 (shown in FIG. 2). The system 200 utilizes this content viewer interaction data to shuffle the sequence of the sequence of recommended content items to determine the optimal content sequence 330. In other words, the system

200 determines an optimal position for displaying each recommended content item in the sequence of recommended content items.

Referring now to FIG. 3, the content viewer interaction data 304, such as the content viewer interaction data explained with reference to FIG. 4, is received in relation to the content sequence 328 for a predefined time T (e.g., 5 hours) by the optimal content sequence generator 212 via the communication module 208 (shown in FIG. 2). In other words, content viewer interaction data is aggregated for a predefined time. The scoring module 310 in the optimal content sequence generator 212 is configured to again provide a score for each recommended content item based on the content viewer interaction data 304 received for the predefined time period T and the scoring policy 322. It is noted that the content viewer interaction data 304 received in relation to each recommended content item for that predefined time 'T' alone is analyzed to determine the score for each recommended content item. Further, as already explained, the ranking module 312 is configured to assign a rank for each recommended content item based on corresponding scores and the ranking policy 324, which may also indicate a position for each recommended content item among the sequence of recommended content items. In general, ranking of the plurality of recommended content items determines a content sequence, such as the content sequence 328, for the display of the plurality of recommended content items. The shuffling check module 314 is configured to determine if the number of iterations is greater than a predefined threshold. In at least one example embodiment, the shuffling check module 314 checks if the shuffling operation has been performed for at least the predefined threshold (ST). More specifically, the shuffling check module 314 ensures that the recommended content items that are not displayed directly (i.e., recommended content other than the set of recommended content) in the UI 402 are provided an option to be displayed directly on the display screen of the electronic device for the viewer during subsequent operations. In one illustrative example, if there are 'n' recommended content items for a content viewer and if only 'm' recommended content items may be displayed in an instant for the content viewer on the display screen of the electronic device, the shuffling check module 314 checks if the shuffling has been performed at least 'n-m' times to ensure that all the recommended content items in the sequence of recommended content items are provided an option of being displayed on the display screen for the predefined time. If a status of the shuffling check indicates a fail status, then the shuffling check module 314 provides the rank and scores corresponding to the sequence of recommended content items to the sequence shuffling module 316.

The sequence shuffling module 316 in conjunction with the instructions of the memory module 204 is configured to shuffle the content sequence of recommended content items based on a shuffling policy 326 stored in the database 210. More specifically, the sequence shuffling module 316 rearranges the position of each recommended content item in the content sequence 328 such that all recommended content items are displayed to the content viewers, directly, on their respective electronic devices. To that effect, the sequence shuffling module 316 determines a new position for at least one recommended content item that does not appear on the display screen based on the sequence shuffling policy 326. The shuffling policy 326 includes a plurality of shuffling rules to ensure the shuffling of recommended content items in a systematic way such that all recommended content items appear among a set of recommended content items that are displayed on the display screen. The shuffling policy 326 ensures that positions of all recommended content items are shuffled at every iteration to determine the receptiveness or performance of the recommended content items at every position in the sequence of recommended content items. An example of a sequence shuffling rule may be as follows:

Shuffling Rule: (1a) assign a content item with a maximum number of views among the 'n' recommended content items that are not displayed directly on the display screen of the viewers for a predefined time to a position 1' (i.e., p=1), (1b) assign all other content items a new position by moving them to a next position (i.e., p+1) in the sequence.

In one illustrative example, if the content sequence (i.e., position for each recommended content item) is as follows: drama 1, drama 2, drama 3, drama 4, drama 5, and drama 6. Assuming the content items drama 1, drama 2, and drama 3 are displayed on the display screen and the other content items, i.e., drama 4, drama 5, and drama 6 have to be accessed by performing an additional cognitive step, and drama 4 has maximum click through rates among the content items that are not displayed on the display screen (i.e., maximum click through rates among content items drama 4, drama 5 and drama 6), then drama 4 may be assigned a position 1 and a content sequence 328 of the sequence of recommended content items may be adapted to drama 4, drama 1, drama 2, drama 3, drama 6, and drama 5. The adapted content sequence (i.e., drama 4, drama 1, drama 2, drama 3, drama 6, and drama 5) is now provided to all content viewers for the predefined time 'T'. As such, only the content items i.e., drama 4, drama 1, and drama 2 alone will be displayed on the display screen of the electronic devices of content viewers and the viewers may have to swipe/scroll to view the other contents (i.e., drama 3, drama 5 and drama 6). The performance/effectiveness of the contents (i.e., drama 4, drama 1, drama 2, drama 3, drama 6, and drama 5) in their new positions will now be evaluated after the predefined time period 'T'. As already explained, a similar evaluation is carried out by assigning recommended contents in different positions till the status of the shuffling check returns a success status (i.e., the predefined threshold is reached) which is explained in detail later.

It shall be noted that only one sequence shuffling rule has been explained for example purposes and the shuffling policy 326 may include a plurality of shuffling rules to rearrange content such that all recommended content items in the stream of recommended content items are displayed at least once in the display screen of electronic devices for the plurality of related content viewers of a viewer cohort for a predefined time period T. In some example embodiments, a shuffling rule may ensure that a recommended content item is displayed in all possible positions for a given sequence of recommended content items. For example, if the sequence of recommended content items includes TV show 1, TV show 2, TV show 3, TV show 4, and TV show 5, the shuffling rule ensures that each of the TV shows (i.e., TV show 1, TV show 2, TV show 3, TV show 4 and TV show 5) are placed in different positions of the content sequence i.e., position 1, position 2, position 3, position 4 and position 5 for a predefined time period 'T'.

In at least one example embodiment, if a status of the shuffling check module 314 returns a success status, then the performance evaluation module 318 is configured to determine the optimal content sequence 330 for the recommended content items based on the performance of each recommended content item at different positions in the content sequence based on corresponding scores computed in relation to each position assigned to each recommended content item in the content sequence.

Accordingly, the performance evaluation module 318 may include a learning algorithm trained to perform the operations of the scoring module 310, the ranking module 312, and the shuffling check module 314. In an embodiment, the learning algorithm is an AI or ML model. To that end, the performance evaluation module 318 is configured to a performance metric for each recommended content item of the plurality of recommended content items based, at least in part, on the content viewer interaction data via a machine learning model. In a non-limiting example, the machine learning model is a Recursive Neural Network (RNN) model. In other words, the performance evaluation module 318 is configured to compute the score for each recommended content item, rank each recommended content item of the plurality of recommended content items based on the score, rearrange/shuffle the plurality of ranked recommended content items, facilitate the display of a plurality of rearranged recommended content items, and compute and update the content viewer interaction data from the plurality of content viewers based, at least in part, on monitoring interactions of the plurality of content viewers with the plurality of rearranged recommended content items. In particular, the performance evaluation module 318 performs the operations mentioned earlier in an iterative manner till a predefined threshold number of attempts. It is understood that the predefined threshold is determined based, at least in part, on a total number of the plurality of recommended content items and a number of recommended content items that can be displayed on a display screen of the electronic device 104 at any given instant. For example, the performance evaluation module 318 may be capable of determining performance metric of the recommended content item at a position for a viewer by collating information such as, click-through rates, reviews, ratings, average view duration, number of views, and the like which are aggregated in relation to each position. In one illustrative example, a movie 4 may have a higher relevancy at position 1 than at position 4 (or any other position) based on the content viewer interaction data 304. Therefore, the performance evaluation module 318 assigns position 1 for the movie 4. Similarly, the performance evaluation module 318 identifies an optimal position for each of the recommended content items based on the content viewer interaction data 304 received in relation to each position for the predefined time. Thereafter, the performance evaluation module 318 generates the optimal content sequence 330 for the plurality of recommended content items 302 and displays the respective content tiles, as exemplarily shown in FIG. 5.

Figure 5:
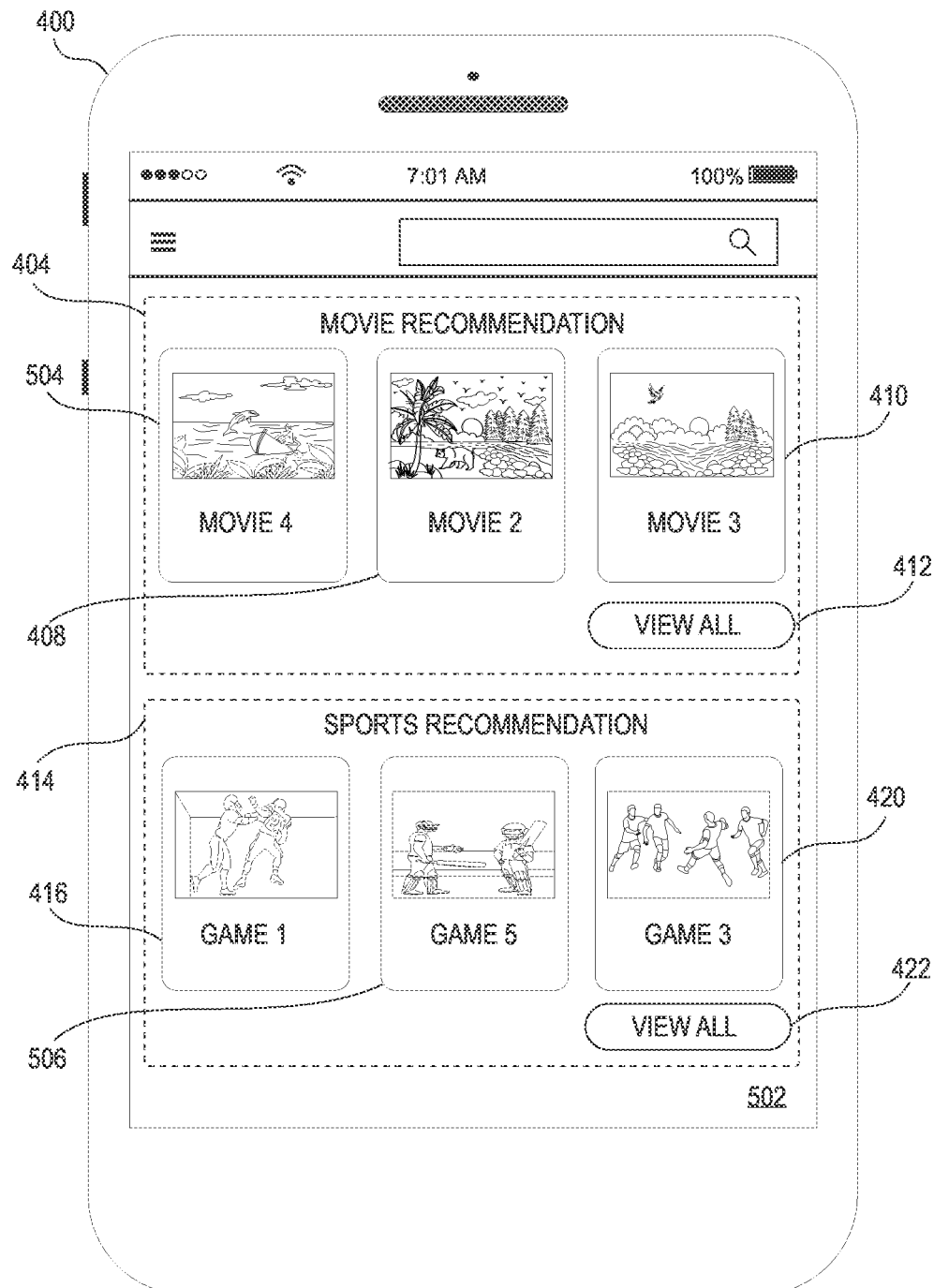
FIG. 5 shows the electronic device of FIG. 4 displaying a UI with the optimal content sequence, in accordance with another embodiment of the present disclosure.

Referring now to FIG. 5, the electronic device 400 of FIG. 4 displaying a UI 502 with the optimal content sequence is shown, in accordance with another embodiment of the present disclosure. More specifically, the UI 502 is a refined home page corresponding to UI 402 recommending content with high relevancy to the content viewer based on the optimal content sequence determined by the system 200. In general, the system 200 assigns a position to each recommended content item in the UI 502 such that they are more effective for access based on their relevancy for the content viewer.

As explained with reference to FIG. 3, the optimal content sequence 330 for plurality of recommended content items 302 may be determined based on the performance metrics for the plurality of recommended content items. The performance metric being computed for each recommended content item of the plurality of recommended content items based, at least in part, on the content viewer interaction data 304 received in relation to different positions assigned for each recommended content item of the plurality of recommended content items 302. As explained earlier, the performance metrics are computed via a machine learning model. In an example, the machine learning model is a recursive neural network (RNN) model. More specifically, the plurality of recommended content items are assigned different positions in a content sequence for a predefined time based on shuffling policy (see, shuffling policy 326 in FIG. 3) and are ranked based on the content viewer interaction data 304. In general, the shuffling policy 326 ensures that each recommended content item is displayed on the display screen of the electronic device 400 (i.e., among a set of recommended content directly displayed for the viewer) for at least one predefined time period. The content viewer interaction data (i.e., watch time, click-through rates, reviews, ratings, average view duration, etc.) are tracked during each predefined time period for each recommended content item to determine an optimal position for each recommended content item.

In this example representation, the system 200 rearranges the recommended content items in the section 404 (shown in FIG. 4) i.e., MOVIE 1, MOVIE 2, MOVIE 3, MOVIE 4, MOVIE 5, and MOVIE 6 based on the content viewer interaction data to new positions to configure the optimal content sequence. For example, the stream of recommended content items may now be rearranged to reflect the sequence as MOVIE 4, MOVIE 2, MOVIE 3, MOVIE 1, MOVIE 6, and MOVIE 5 to eliminate the positional bias and increase engagement of viewers by arranging the recommended content items in respective positions where the content may be more receptive by the content viewers. It shall be noted that only a set of recommended content i.e., MOVIE 4, MOVIE 2, MOVIE 3 represented by content tiles 504, 408, and 410, respectively alone are displayed on the display screen of the electronic device 400.

Similarly, the system 200 rearranges the recommended content items in the section 414 (shown in FIG. 4) i.e., GAME 1, GAME 2, GAME, 3, GAME 4, GAME 5, and GAME 6 based on the content viewer interaction data to new positions to configure the optimal content sequence. For example, the stream of recommended content items may now be rearranged to reflect the sequence as GAME 1, GAME 5, GAME, 3, GAME 4, GAME 2, and GAME 6 to eliminate the positional bias. It shall be noted that only a set of recommended content i.e., GAME 1, GAME 5, GAME, 3, represented by content tiles 416, 506, and 420, respectively alone are displayed on the display screen of the electronic device 400.

Referring now to FIG. 2, the contact analyzer 214 in the processing module 202 is configured to, in conjunction with an application of the content provider running on the electronic device of the viewer, receive information related to a plurality of contacts in a digital phonebook (hereinafter referred to as the phonebook) of the viewer. The contact analyzer 214 is further configured to access phonebook data of the content viewer 102 from the electronic device 104 of the content viewer 102. In an example, the phonebook data includes at least a plurality of contacts of the content viewer 102. The contact analyzer 214 is further configured to analyze the information related to the plurality of contacts to identify at least one contact of the content viewer 102 who is subscribed to the content provider. Further, contact analyzer 214 is configured to determine if at least one contact from the plurality of contacts is one of a plurality of related content viewers of the viewer cohort. In other words, whether the viewing preferences of at least one contact match the content viewer's content viewing preferences. The contact analyzer 214 is configured to track the viewing activities of such contacts, and recommend content items to the viewer based on similar content accessed from the content provider by the contacts. Further, the contact analyzer 214 is configured to adjust the score for each recommended content item of the plurality of recommended content items based, at least in part, on the contact behavior data of at least one contact, wherein the contact behavior data is accessed from the database 210. Further, in some embodiments, the contact analyzer 214 is also configured to generate notifications, as will be explained later with reference to FIG. 7. The analysis performed by the contact analyzer 214 of the system 200 is explained next with reference to FIG. 6.

Figure 6:
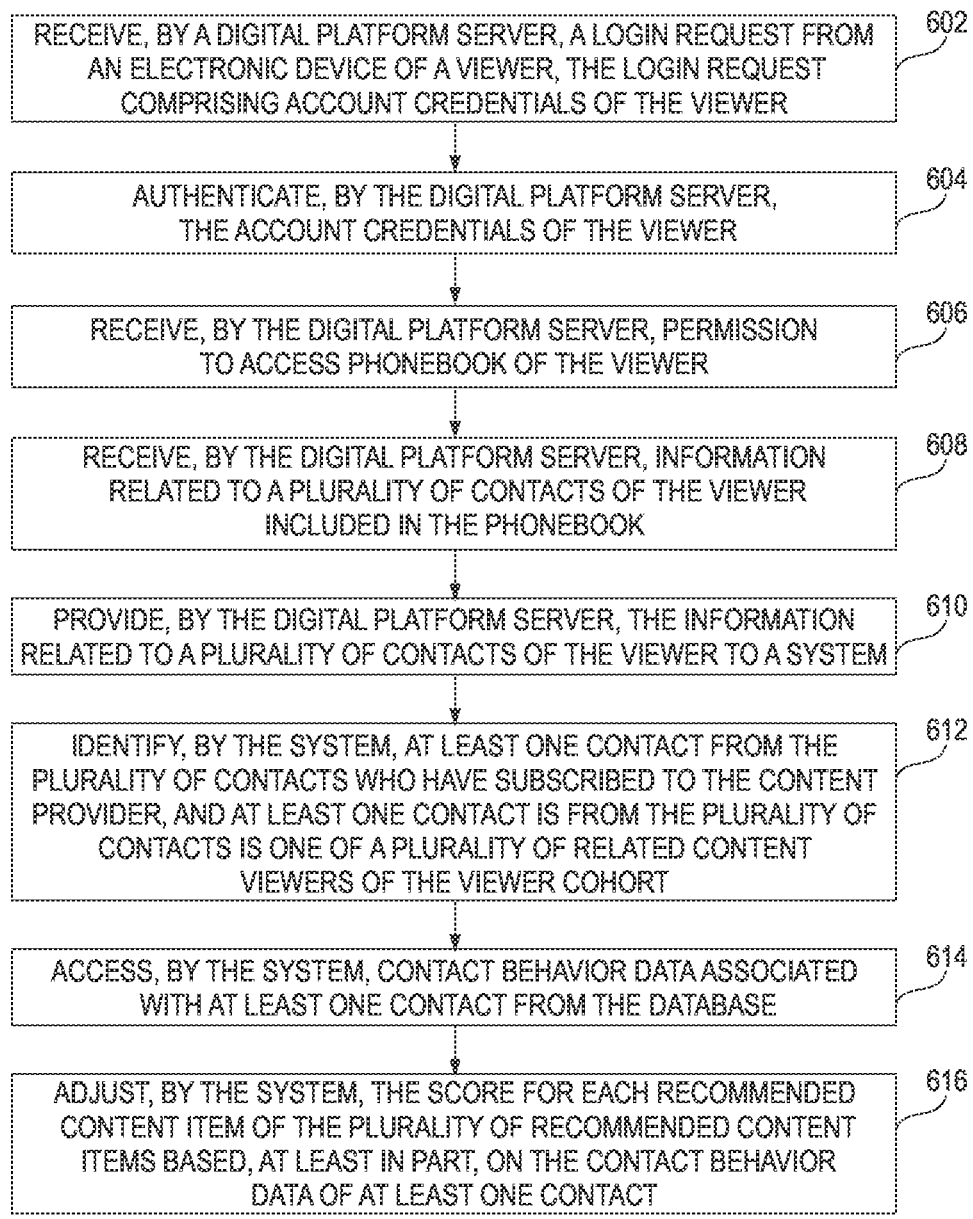
FIG. 6 shows a flow diagram for illustrating a process flow for adjusting scores for each recommended content item of the plurality of recommended content items, in accordance with an embodiment of the present disclosure.

FIG. 6 shows a flow diagram for illustrating a process flow 600 for adjusting scores for each recommended content item of the plurality of recommended content items, in accordance with an embodiment of the present disclosure.

At 602, a login request is received by a digital platform server, such as the digital platform server 110 shown in FIG. 1, associated with a content provider. The login request is received from an application running on an electronic device (such as electronic device 104) of a content viewer (such as content viewer 102). The login request includes the account credentials of the content viewer.

At 604, the digital platform server authenticates the account credentials of the content viewer. The digital platform server may use one or more authentication techniques to authenticate the account credentials, and the authentication techniques are not explained herein.

At 606, permission to access the phonebook of the content viewer is received by the digital platform server 110 subsequent to successful authentication of the content viewer's account credentials. In an illustrative example, the application installed in the content viewer's electronic device 104, such as a smartphone, may prompt the viewer to provide access to the phonebook during the login process. When the content viewer provides his/her consent, the application receives the permission to access the phonebook data. The phonebook data may include information related to a plurality of contacts of the content viewer.

At 608, the information related to the plurality of contacts of the content viewer is received by the digital platform server 110 from the phonebook subsequent to receipt of the permission to access the phonebook. More specifically, the application accesses the phonebook of the content viewer from the electronic device 104 and forwards the information related to the plurality of contacts to the digital platform server 110.

At 610, the digital platform server 110 provides the information related to the plurality of contacts to a system such as, the system 200, explained with reference to FIGS. 2-5. More specifically, the contact analyzer 214 of the system 200 is configured to receive the information related to the plurality of contacts of the content viewer 102. The subsequent steps of the process flow 600, though mentioned to be performed by the system, may be understood to be performed by the contact analyzer 214 of the system 200.

At 612, the system attempts to identify at least one contact from the plurality of contacts who have subscribed to the content provider and at least one contact is from the plurality of contacts is one of a plurality of related content viewers of the viewer cohort. The system 200 may compare individual contacts from the plurality of contacts with content viewer profiles in the viewer profile pool (shown as viewer profile pool 320) to determine if any contact of the viewer is registered with the content provider. If at least one contact is registered with the content provider, then the system 200 performs a check to determine if the contact has viewed content similar to the content watched/preferred by the content viewer, for example, the content viewer 102. In one illustrative example, the contact may have watched the film series of the Pirates of the Caribbean and a contact, i.e., a friend/acquaintance of the viewer who is also a subscriber of the content provider may have recently watched the movie 'The National Treasure' after watching Pirates of the Caribbean: Dead man's Chest. The system identifies that both the viewer and the friend/acquaintance prefer similar genres i.e., adventurous fantasy movies based on the content viewed in the past. However, if none of the contacts in the phonebook are registered with the content provider or if the viewer and the friend/acquaintance do not share common interests, the system does not perform any further processing and the method 600 ends.

At 614, the system 200 accesses contact behavior data associated with at least one contact from the database 210. Alternatively, if more than one contact is identified at step 612, then a set of contact behavior data associated with the plurality of identified contacts is accessed from the database 210.

At 616, the system adjusts the score for each recommended content item of the plurality of recommended content items based, at least in part, on the contact behavior data of at least one contact. The method 600 ends at step 616.

Further, in an optional scenario, the system generates at least one notification for the viewer based on the content viewed by the identified at least one contact. The notification includes a recommendation for the viewer to view the content item viewed by the contact (i.e., the friend/acquaintance). An example of one such notification displayed to the viewer is shown and explained with reference to FIG. 7.

Figure 7:
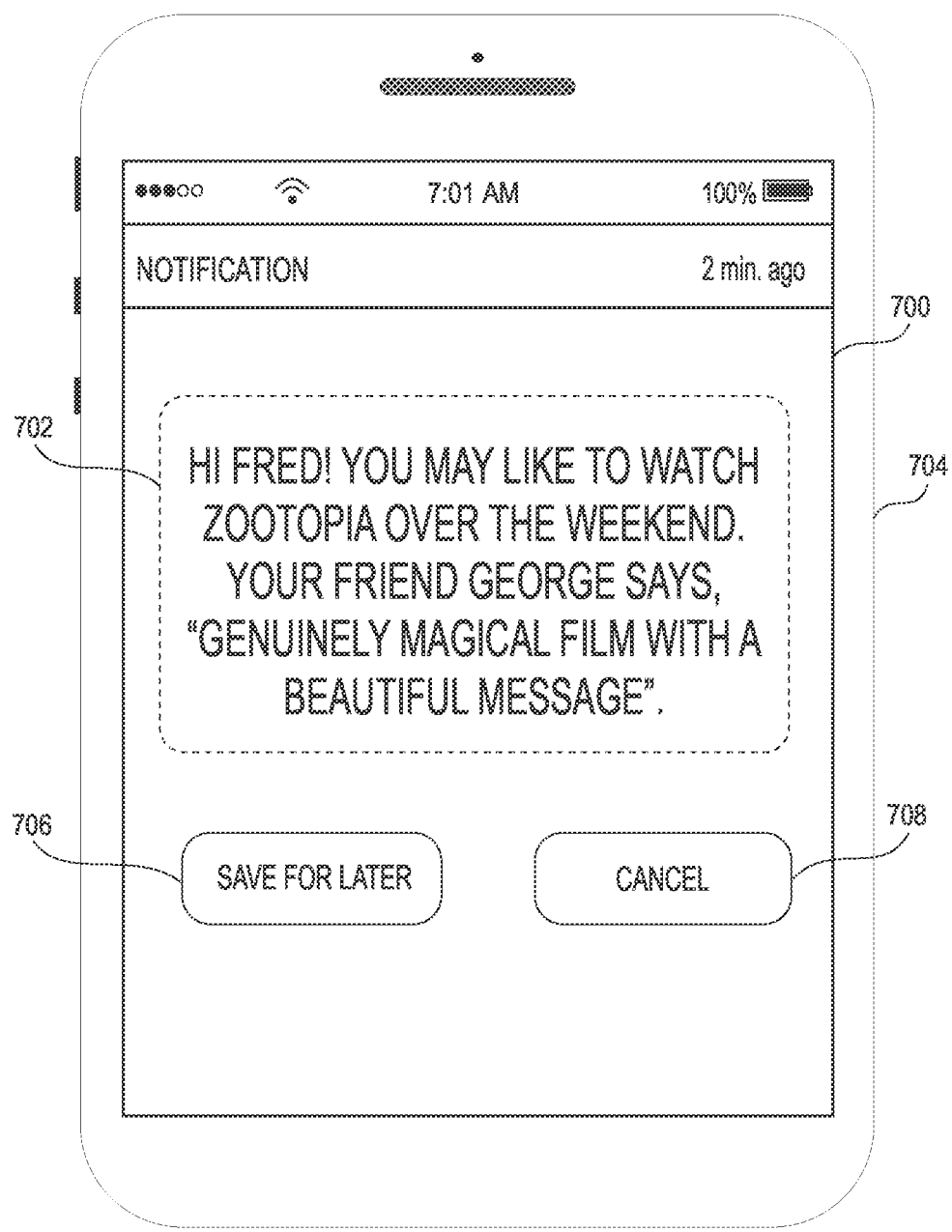
FIG. 7 shows an example representation of a UI including a notification recommending content to a content viewer is depicted in accordance with an embodiment of the present disclosure.

Referring now to FIG. 7, an example representation of a UI 700 including a notification 702 recommending content to a content viewer is shown, in accordance with an embodiment of the present disclosure. As explained with reference to FIGS. 2 and 6, the contact analyzer 214 of the system 200 is configured to analyze the information related to the plurality of contacts of the content viewer, as recorded in the content viewer's phonebook, to determine if any of the contacts is also a subscriber of the content provider and has viewing preferences that match the content viewer's content viewing preferences. If such a contact is identified, then the contact analyzer 214 is configured to track the viewing activities of the contact and generate notifications such as the notification 702.

In one embodiment, the UI 700 is displayed on a display screen of an electronic device 704 of the content viewer subsequent to the content viewer logging into a content viewer account provided by the content provider. In another embodiment, the system 200 may constantly track activities (i.e., online content viewer behavior) of contacts in the phonebook and notify the content viewer when one or more contacts view similar content. The electronic device 704 of the content viewer is an example of the electronic device 104 associated with the content viewer 102 (shown in FIG. 1).

The notification 702 is exemplarily depicted to include the text 'HI FRED! YOU MAY LIKE TO WATCH ZOOTOPIA OVER THE WEEKEND. YOUR FRIEND GEORGE SAYS, "GENUINELY MAGICAL FILM WITH A BEAUTIFUL MESSAGE". As already explained with reference to FIGS. 2 and 6, if the acquaintance and the content viewer have viewed similar content in the past, the watch history of the acquaintance is tracked to determine if the acquaintance viewed any other recommended content provided by the content provider and positional information related to the recommended content. Thereafter, the system 200 may recommend the content for the content viewer in an instant notification such as the notification 702.

The UI 700 also includes a tab 706 and 708, exemplarily depicted to be associated with text 'SAVE FOR LATER' and 'CANCEL', respectively. The content viewer can click on the tab 706 to save the content recommendation for viewing at a later point in time. A touch or click selection input on the tab 708 provided in the notification 702 is configured to decline the content recommended by the system 200. It is noted that a notification provided to the content viewer is depicted as an SMS notification for illustration purposes and that the notification may be embodied as a push notification, such as a Web browser notification or an OS/application notification. Further, the customer's electronic device 704 is depicted as a smartphone for illustration purposes.

Examples of flow diagrams for recommending content to content viewers is explained next with reference to FIGS. 8 and 9.

Figure 8A:
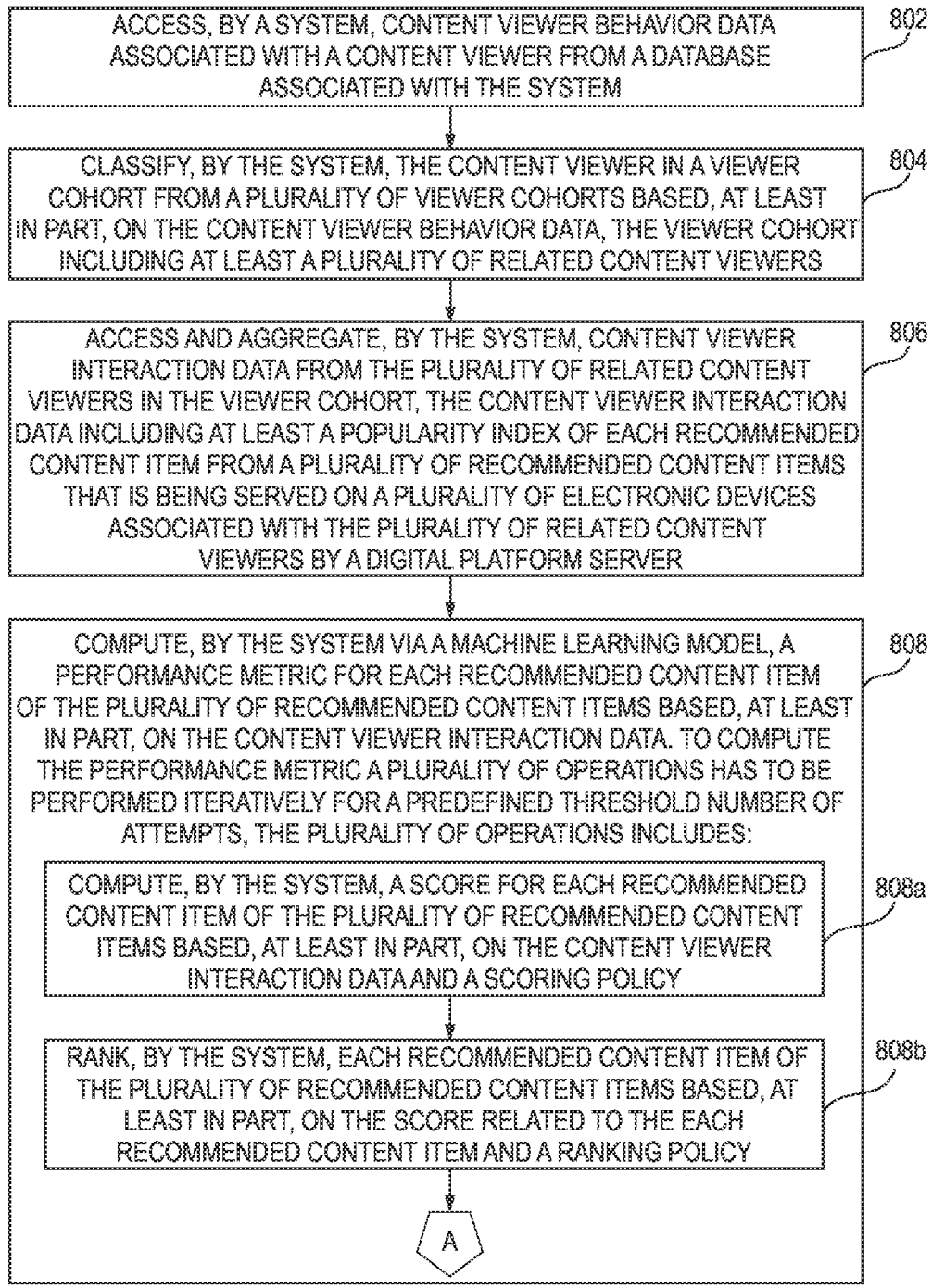
FIGS. 8A and 8B, collectively, show a flow diagram of a method for facilitating content recommendation to a content viewer, in accordance with an embodiment of the present disclosure.
Figure 8B:
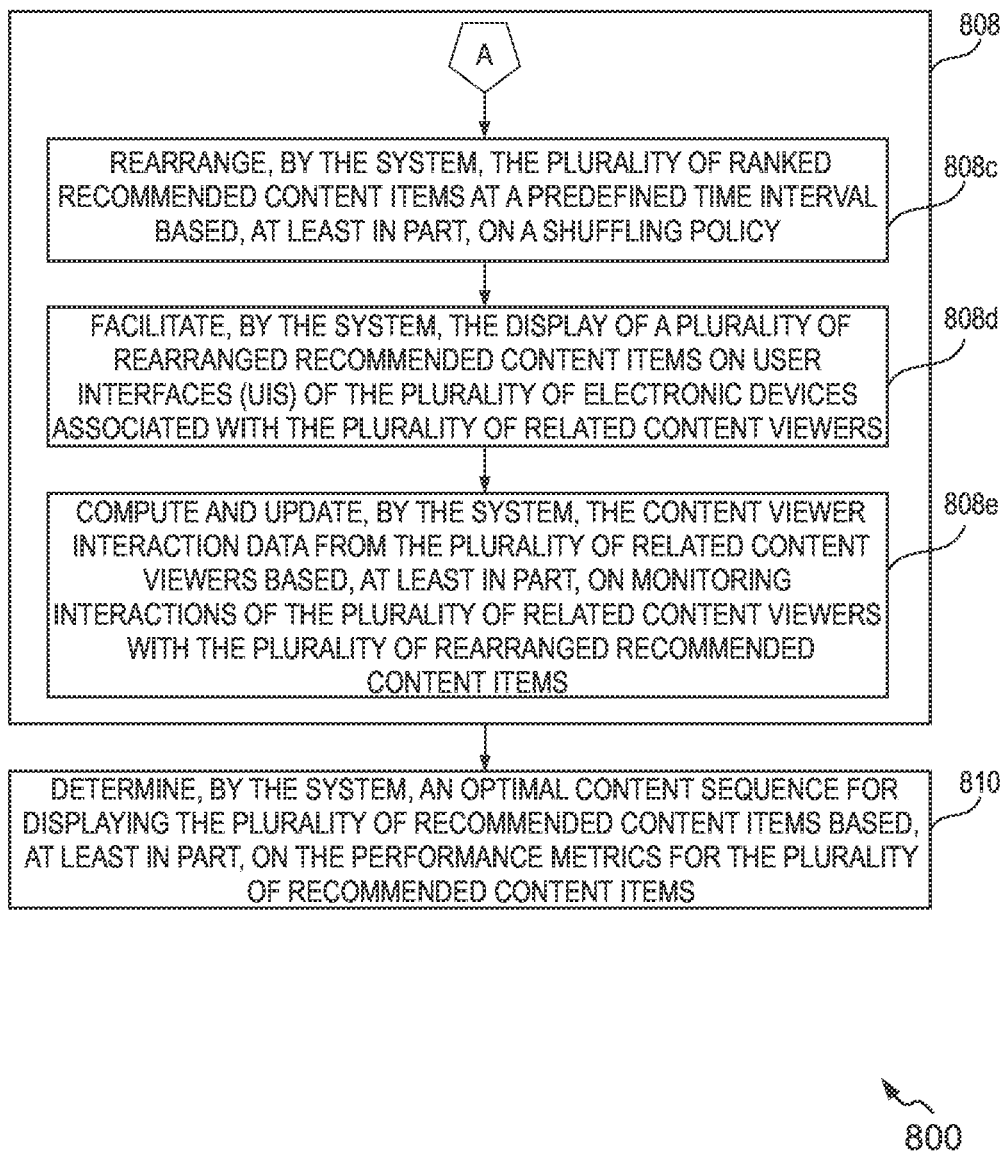

FIGS. 8A and 8B, collectively, show a flow diagram of a method 800 for facilitating content recommendation to a content viewer, in accordance with an embodiment of the present disclosure. The various steps and/or operations of the flow diagram, and combinations of steps/operations in the flow diagram, may be implemented by, for example, hardware, firmware, a processor, circuitry and/or by a system such as the system 200 explained with reference to FIGS. 2 to 7 and/or by a different device associated with the execution of software that includes one or more computer program instructions. The method 800 starts at operation 802.

At operation 802 the method 800 includes accessing, by a system (such as system 200 explained with reference to FIGS. 2-6), content viewer behavior data associated with a content viewer (such as content viewer 102 shown in FIG. 1) from a database (such as database 210 shown in FIG. 2) associated with the system 200. In an embodiment, the content viewer behavior data is one of accumulated data over a defined time period, real-time data, and/or a combination thereof.

At operation 804 the method 800 includes classifying, by the system 200, the content viewer 102 in a viewer cohort from a plurality of viewer cohorts based, at least in part, on the content viewer behavior data. The viewer cohort includes at least a plurality of related content viewers.

At operation 806 the method 800 includes accessing and aggregating, by the system 200, content viewer interaction data from the plurality of related content viewers in the viewer cohort. The content viewer interaction data includes at least a popularity index of each recommended content item from a plurality of recommended content items that is being served on a plurality of electronic devices associated with the plurality of related content viewers by a digital platform server (such as digital platform server 110). The popularity index is determined based, at least in part, on interaction information associated with each of the plurality of related content viewers. The interaction information includes at least click-through rates, average view duration, watch history, search terms, comments, ratings, number of views related to each recommended content item placed at different positions on UIs of the plurality of electronic devices associated with each of the plurality of related content viewers and the like. In other words, the performance metric in relation to each of the plurality of recommended content items during the predefined time period is collated to determine click-through rates and/or number of content views. It shall be noted that the performance metric may also include information such as ratings, reviews for each recommended content item in the content sequence, and the like, collated over the predefined time apart from the click through rates and the number of content views for each recommended content item.

At operation 808 the method 800 includes computing, by the system 200 via a machine learning model, a performance metric for each recommended content item of the plurality of recommended content items based, at least in part, on the content viewer interaction data. It is noted that the performance metric indicates the performance of a recommended content item at each position, i.e., the receptiveness of the recommended content item. In order to compute the performance metric a plurality of operations (808a-808d) has to be performed iteratively for a predefined threshold number of attempts. In general, the predefined threshold is a preset value that is determined based, at least in part, on a total number of the plurality of recommended content items and a number of recommended content items that may be displayed on the display screen of the electronic device 104 at any given instant. The predefined threshold ensures that all recommended content items appear on the display screen at least once. The plurality of operations 808a-808e begins at operation 808a.

At operation 808a the method 800 includes computing, by the system 200, a score for each recommended content item of the plurality of recommended content items based, at least in part, on the content viewer interaction data and a scoring policy. More specifically, the scoring policy may be used to assign scores for each recommended content item. For example, the scoring policy defines a plurality of rules to assign weight values to the recommended content items based on different parameters/factors such as, click through rates, number of views, watch time, relevancy, similarity, and the like collated over the predefined time for each recommended content item (i.e., content viewer interaction data). Assigning weight values based on different parameters to each recommended content item and determining scores is explained with reference to FIG. 3 and is not explained herein for the sake of brevity.

At operation 808b the method 800 includes ranking, by the system 200, each recommended content item of the plurality of recommended content items based, at least in part, on the score related to the each recommended content item and a ranking policy. In other words, the plurality of recommended content items are ranked based on their corresponding scores.

At operation 808c the method 800 includes rearranging, by the system 200, the plurality of ranked recommended content items at a predefined time interval based, at least in part, on a shuffling policy. In other words, the plurality of ranked recommended content items are shuffled/rearranged based on the shuffling policy. The shuffling policy ensures that at least one recommended content that was not displayed on the display screen of the electronic device (such as electronic device 104) apart from the set of recommended contents is moved to a position such that it appears on the display screen of the electronic device 104. The rearrangement of the plurality of ranked recommended content based on the shuffling policy may be performed as explained with reference to FIGS. 3 to 5 and is not explained again herein for the sake of brevity.

At operation 808d the method 800 includes facilitating, by the system 200, the display of a plurality of rearranged recommended content items on User Interfaces (UIs) of the plurality of electronic devices associated with the plurality of related content viewers.

At operation 808e the method 800 includes computing and updating, by the system 200, the content viewer interaction data from the plurality of related content viewers based, at least in part, on monitoring interactions of the plurality of related content viewers with the plurality of rearranged recommended content items.

At operation 810 the method 800 includes determining, by the system, an optimal content sequence for displaying the plurality of recommended content items based, at least in part, on the performance metrics for the plurality of recommended content items. It is noted that the optimal content sequence indicates a sequence for displaying each recommended content item of the plurality of recommended content items on an electronic device (such as 104) of the content viewer 102. In general, the performance metrics obtained for the plurality of recommended content items at different positions in the content sequence are analyzed to determine an optimal position for each recommended content. In at least one embodiment, a machine learning model may be trained to analyze the performance metric of each recommended content item in relation to each position occupied by each of the recommended content to identify a relevant position for each recommended content. The optimal positions identified for each recommended content item of the plurality of recommended content items is referred to as the optimal content sequence. It is understood that since the optimal content sequence is determined indirectly in response to the content viewer behavior, the optimal content sequence will be different for different content viewers. More specifically, even if one or more content viewers are using the same subscriber account through different electronic devices, the optimal content sequence being displayed to them will be different. As may be understood, real-time user behavior will also impact the optimal content sequence. For example, if family members of a subscriber access the content provider platform through different profile options or through the same profile option, the optimal content sequence of recommended content items shown to them will be different since the family members will have different behavioral characteristics. The method 800 ends at operation 810.

Figure 9A:
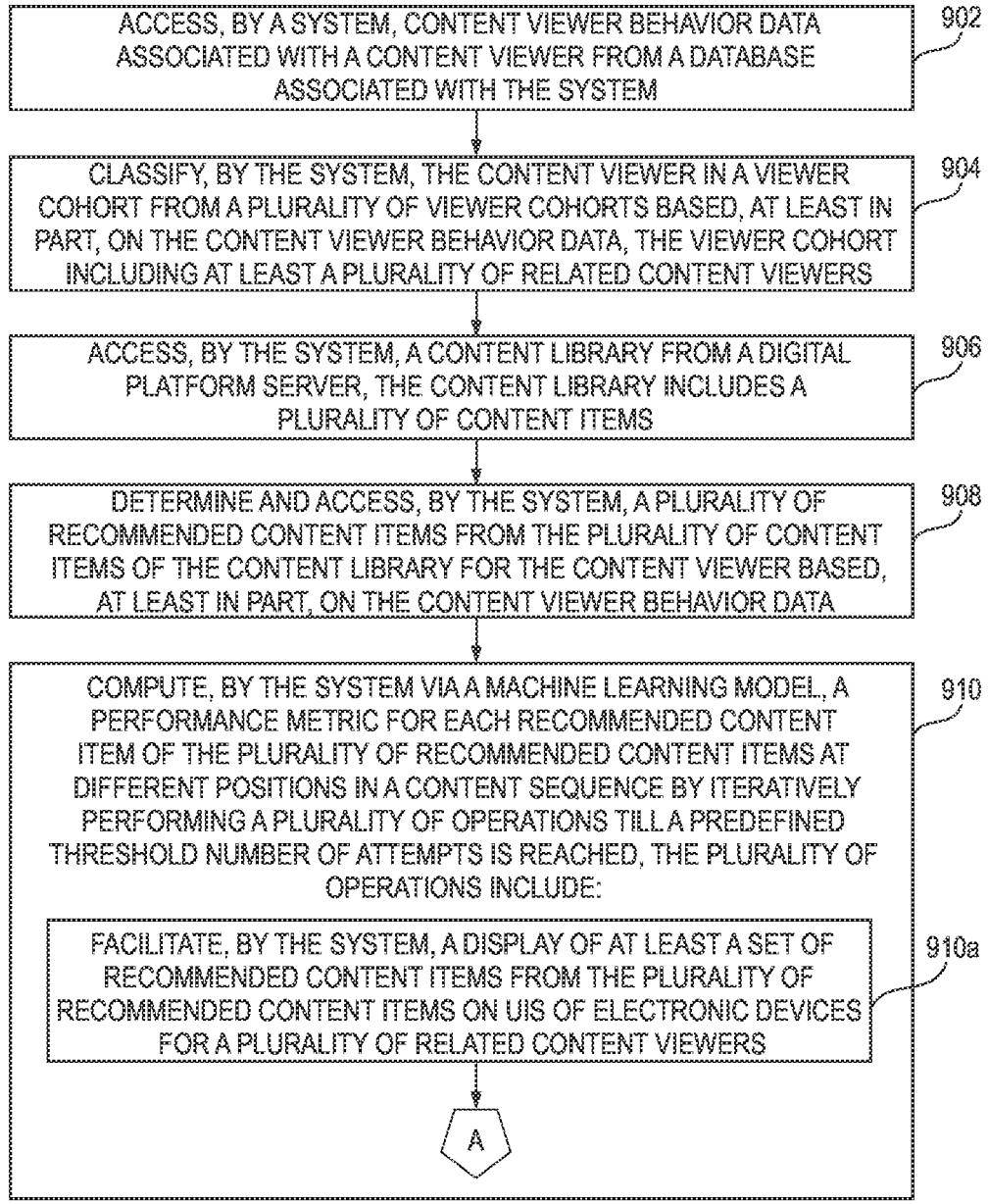
FIGS. 9A, 9B, and 9C, collectively, show a flow diagram of a method for facilitating content recommendation to a content viewer, in accordance with another embodiment of the present disclosure.
Figure 9B:
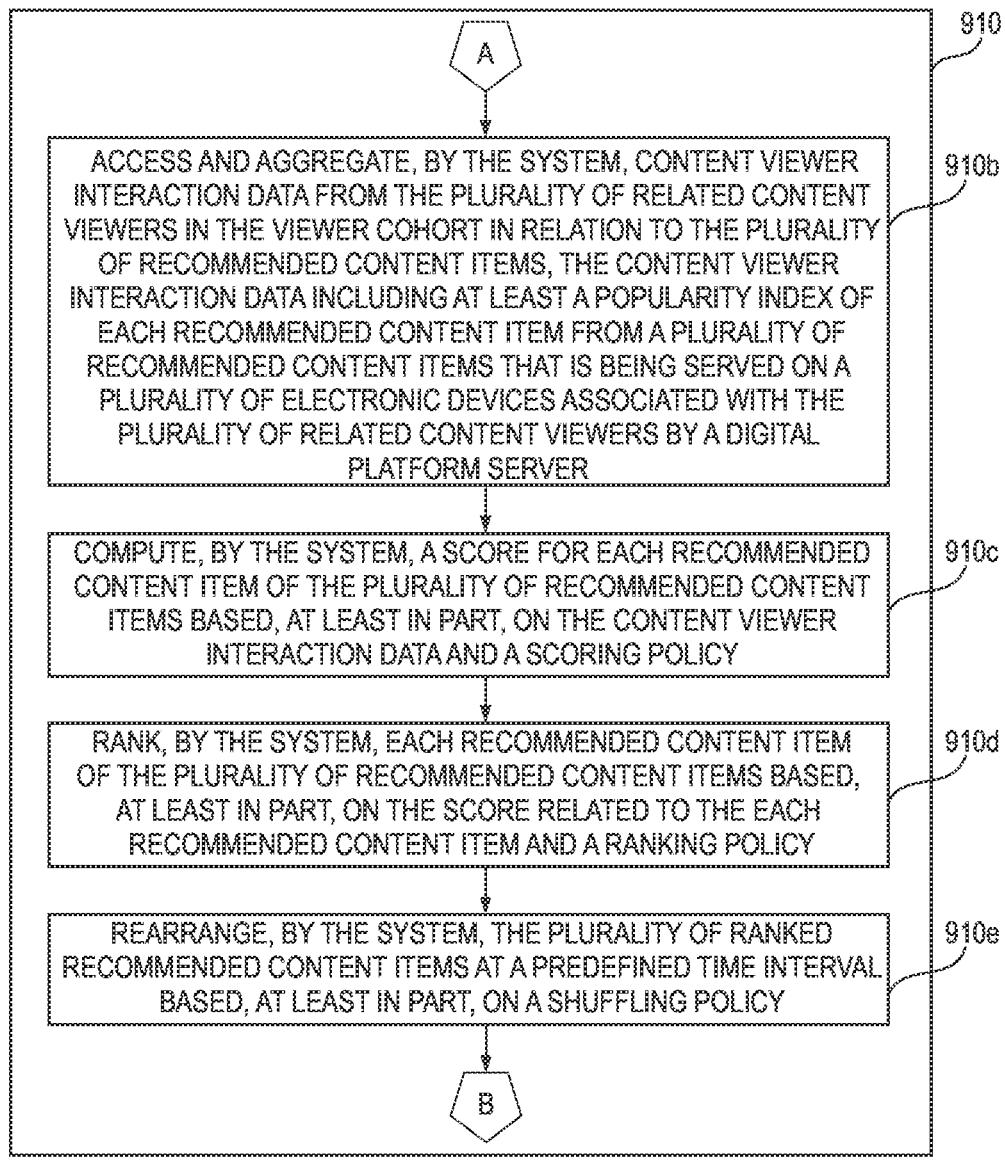
Figure 9C:
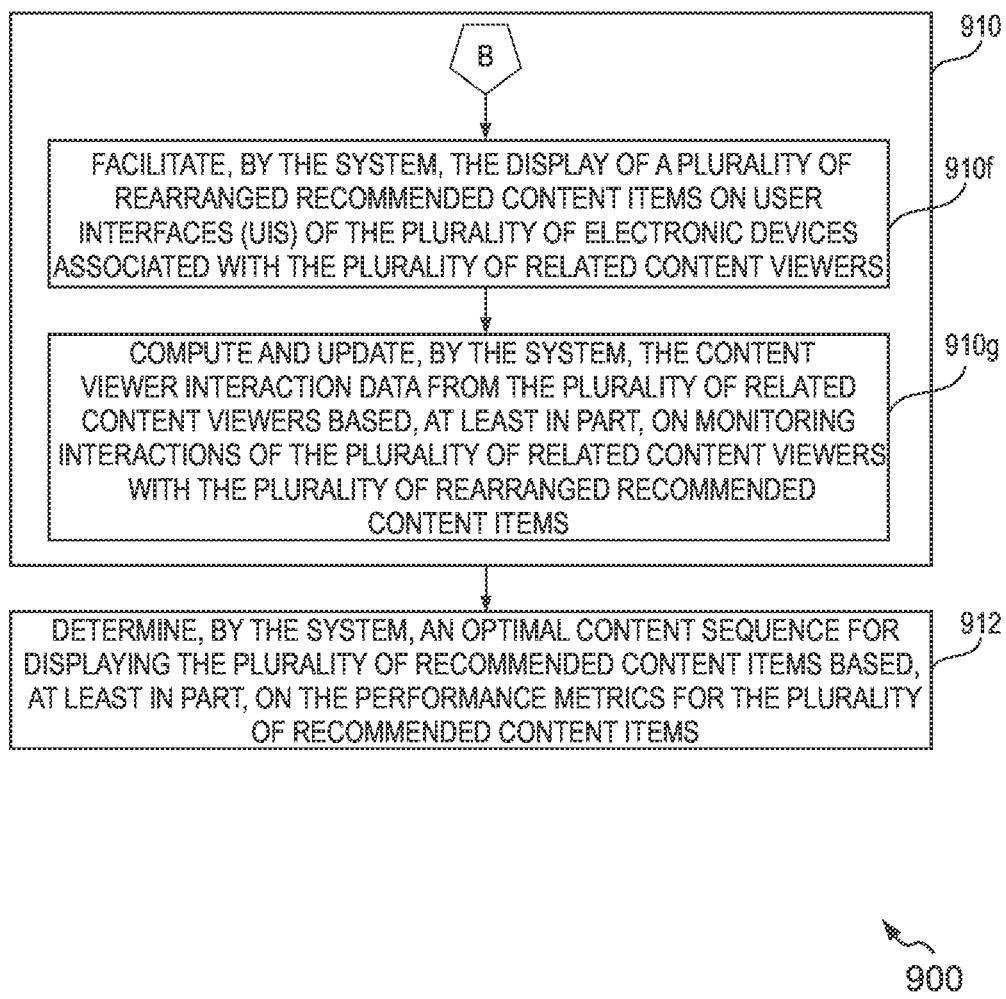

FIGS. 9A, 9B, and 9C, collectively, show a flow diagram of a method for facilitating content recommendation to a content viewer, in accordance with another embodiment of the present disclosure. The various steps and/or operations of the flow diagram, and combinations of steps/operations in the flow diagram, may be implemented by, for example, hardware, firmware, a processor, circuitry, and/or by a system such as the system 200 explained with reference to FIGS. 2 to 7 and/or by a different device associated with the execution of software that includes one or more computer program instructions. The method 900 starts at operation 902.

At operation 902 the method 900 includes accessing, by a system (such as system 200 explained with reference to FIGS. 2-6), content viewer behavior data associated with a content viewer (such as content viewer 102 shown in FIG. 1) from a database (such as database 210 shown in FIG. 2) associated with the system 200.

At operation 904 the method 900 includes classifying, by the system 200, the content viewer 102 in a viewer cohort from a plurality of viewer cohorts based, at least in part, on the content viewer behavior data. The viewer cohort includes at least a plurality of related content viewers.

At operation 906 the method 900 includes accessing, by the system, a content library from a digital platform server (such as the digital platform server 110 shown in FIG. 1). The content library includes a plurality of content items.

At operation 908 the method 900 includes determining and accessing, by the system, a plurality of recommended content items from the plurality of content items of the content library for the content viewer based, at least in part, on the content viewer behavior data.

At operation 910 the method 900 includes computing, by the system 200 via a machine learning model, a performance metric for each recommended content item of the plurality of recommended content items at different positions in a content sequence by iteratively performing a plurality of operations 910a-910g till a predefined threshold number of attempts is reached. More specifically, the performance of a recommended content item at each position is evaluated to determine the receptiveness of the recommended content item.

At operation 910a the method 900 includes facilitating, by the system 200, a display of at least a set of recommended content items from the plurality of recommended content items on UIs of electronic devices for a plurality of related content viewers. The set of recommended content is displayed on the UI for a predefined time. In general, the plurality of recommended content items are scored and ranked based on a plurality of factors and scoring policy. The plurality of recommended content items are arranged in a content sequence based on the ranking and only top ranked recommended content (i.e., top 4 ranked recommended content) are displayed directly on the UI for the related content viewers. These top-ranked recommended content that appear on the UIs of the electronic devices for the plurality of related content viewers are referred to herein as a 'set of recommended content items'. In one illustrative example, if 10 contents have been recommended for a content viewer, only the recommended content items with the top 4 ranks are displayed on the UIs for the related content viewers.

At operation 910b the method 900 includes accessing and aggregating, by the system 200, content viewer interaction data from the plurality of related content viewers in the viewer cohort in relation to the plurality of recommended content items. The content viewer interaction data includes at least a popularity index of each recommended content item from a plurality of recommended content items that is being served on a plurality of electronic devices associated with the plurality of related content viewers by a digital platform server. In general, popularity of a recommended content item at each position in the content sequence is indicated by the content viewer interaction data.

At operation 910c the method 900 includes computing, by the system 200, a score for each recommended content item of the plurality of recommended content items based, at least in part, on the content viewer interaction data and a scoring policy.

At operation 910d the method 900 includes ranking, by the system 200, each recommended content item of the plurality of recommended content items based, at least in part, on the score related to the each recommended content item and a ranking policy.

At operation 910e the method 900 includes rearranging, by the system 200, the plurality of ranked recommended content items at a predefined time interval based, at least in part, on a shuffling policy.

At operation 910f the method 900 includes facilitating, by the system 200, the display of a plurality of rearranged recommended content items on User Interfaces (UIs) of the plurality of electronic devices associated with the plurality of related content viewers.

At operation 910g the method 900 includes computing and updating, by the system 200, the content viewer interaction data from the plurality of related content viewers based, at least in part, on monitoring interactions of the plurality of related content viewers with the plurality of rearranged recommended content items.

At operation 912 the method 900 includes determining, by the system, an optimal content sequence for displaying the plurality of recommended content items based, at least in part, on the performance metrics for the plurality of recommended content items. The method 900 ends at operation 912.

Various embodiments disclosed herein provide numerous advantages. More specifically, the embodiments disclosed herein suggest techniques for recommending content to viewers. The recommended contents are arranged in an optimal order sequence that eliminates the positional bias of conventional solutions. As the recommended contents are shuffled to different positions based on the number of views or watch rates, the optimal content sequence is a reflection of how receptive the content is at a specific position. Moreover, classifying viewers into cohorts based on similarity in their online viewer behavior significantly reduces the required resources, provides computational savings, and reduced processing time for recommending content to viewers with similar online behavior. As such, the quality of the viewing experience provided to the viewers is significantly improved and viewer engagement and loyalty with the content provider are significantly enhanced.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, thereby enabling others skilled in the art to best utilize the present disclosure and various embodiments with various modifications as are suited to the particular use contemplated.

What is claimed is:

1. A computer-implemented method, comprising:
    accessing, by a system, content viewer behavior data associated with a content viewer from a database associated with the system;
    classifying, by the system, the content viewer in a viewer cohort from a plurality of viewer cohorts based, at least in part, on the content viewer behavior data, the viewer cohort comprising a plurality of related content viewers;
    accessing and aggregating, by the system, content viewer interaction data from the plurality of related content viewers in the viewer cohort, the content viewer interaction data comprising a popularity index of each recommended content item from a plurality of recommended content items that is being served on a plurality of electronic devices associated with the plurality of related content viewers by a digital platform server;
    computing, by the system via a machine learning model, a performance metric for each recommended content item of the plurality of recommended content items based, at least in part, on the content viewer interaction data; and
    determining, by the system, an optimal content sequence for displaying the plurality of recommended content items based, at least in part, on the performance metrics for the plurality of recommended content items, the optimal content sequence indicating a sequence for displaying each recommended content item of the plurality of recommended content items on an electronic device of the content viewer;
    wherein computing the performance metric comprises performing a plurality of operations iteratively for a predefined threshold number of attempts, the plurality of operations comprising:
    computing, by the system, a score for each recommended content item of the plurality of recommended content items based, at least in part, on the content viewer interaction data and a scoring policy;
    ranking, by the system, each recommended content item of the plurality of recommended content items based, at least in part, on the score related to the each recommended content item and a ranking policy;
    rearranging, by the system, the plurality of ranked recommended content items at a predefined time interval based, at least in part, on a shuffling policy;
    facilitating, by the system, the display of a plurality of rearranged recommended content items on User Interfaces (UIs) of the plurality of electronic devices associated with the plurality of related content viewers; and
    computing and updating, by the system, the content viewer interaction data from the plurality of related content viewers based, at least in part, on monitoring interactions of the plurality of related content viewers with the plurality of rearranged recommended content items.

2. The computer-implemented method as claimed in claim 1, wherein the predefined threshold is determined based, at least in part, on a total number of the plurality of recommended content items and a number of recommended content items that can be displayed on a display screen of the electronic device at a given instant.

3. The computer-implemented method as claimed in claim 1, further comprising: accessing, by the system, phonebook data of the content viewer from the electronic device of the content viewer, the phonebook data comprising a plurality of contacts of the content viewer; and upon determining that at least one contact from the plurality of contacts is one of a plurality of related content viewers of the viewer cohort adjusting, by the system, the score for each recommended content item of the plurality of recommended content items based, at least in part, on contact behavior data of the at least one contact, wherein the contact behavior data is accessed from the database.

4. The computer-implemented method as claimed in claim 1, further comprising:
    accessing, by the system, historical content viewing data of the content viewer from the database; and
    determining, by the system, the content viewer behavior data associated with the content viewer based, at least in part, on the historical content viewing data.

5. The computer-implemented method as claimed in claim 4, further comprising:
    accessing, by the system, real-time content viewing data of the content viewer associated with a live-viewing session from the digital platform server; and dynamically updating, by the system, the content viewer behavior data based, at least in part, on the real-time content viewing data.

6. The computer-implemented method as claimed in claim 1, further comprising:
accessing, by the system, a set of content viewer behavior data associated with a plurality of content viewers from the database;
determining, by the system, a relation metric for the plurality of content viewers based, at least in part, on the set of content viewer behavior data, the relation metric indicating a content preference of each of the plurality of content viewers;
generating, by the system, the plurality of viewer cohorts, each of the plurality of viewer cohorts indicating a content category for the plurality of related content viewers with a same content preference; and
classifying, by the system, the plurality of content viewers between the plurality of viewer cohorts based, at least in part, on the relation metric, each of the plurality of viewer cohorts comprising the plurality of related content viewers.

7. The computer-implemented method as claimed in claim 1, further comprising:
tracking, by the system, interaction information related to each of the plurality of related content viewers, the interaction information comprising click-through rates, average view duration, watch history, search terms, comments, ratings, and number of views related to each recommended content item placed at different positions on UIs of the plurality of electronic devices associated with each of the plurality of related content viewers; and
determining, by the system, the popularity index of each recommended content item based, at least in part, on interaction information related to each of the plurality of related content viewers.

8. The computer-implemented method as claimed in claim 1, further comprising:
accessing, by the system, a content library of the digital platform server from the database, the content library comprising a plurality of content items; and
determining, by the system, the plurality of recommended content items to be served to the content viewer from the content library based, at least in part, on the content viewer behavior data.

9. The computer-implemented method as claimed in claim 1, wherein the machine learning model is a recursive neural network (RNN) model.

10. A system, the system comprising:
a memory for storing instructions; and
a processor configured to execute the instructions and thereby cause the system, at least in part, to:
access content viewer behavior data associated with a content viewer from a database associated with the system;
classify the content viewer in a viewer cohort from a plurality of viewer cohorts based, at least in part, on the content viewer behavior data, the viewer cohort comprising a plurality of related content viewers;
access and aggregate content viewer interaction data from the plurality of related content viewers in the viewer cohort, the content viewer interaction data comprising a popularity index of each recommended content item from a plurality of recommended content items that is being served on a plurality of electronic devices associated with the plurality of related content viewers by a digital platform server;
compute via a machine learning model, a performance metric for each recommended content item of the plurality of recommended content items based, at least in part, on the content viewer interaction data; and
determine an optimal content sequence for displaying the plurality of recommended content items based, at least in part, on the performance metrics for the plurality of recommended content items, the optimal content sequence indicating a sequence for displaying each recommended content item of the plurality of recommended content items on an electronic device of the content viewer;
wherein to compute the performance metric the system is caused to perform a plurality of operations iteratively for a predefined threshold number of attempts, the plurality of operations comprising:
compute a score for each recommended content item of the plurality of recommended content items based, at least in part, on the content viewer interaction data and a scoring policy;
rank each recommended content item of the plurality of recommended content items based, at least in part, on the score related to the each recommended content item and a ranking policy;
rearrange the plurality of ranked recommended content items at a predefined time interval based, at least in part, on a shuffling policy;
facilitate the display of a plurality of rearranged recommended content items on User Interfaces (UIs) of the plurality of electronic devices associated with the plurality of related content viewers; and
compute and update the content viewer interaction data from the plurality of related content viewers based, at least in part, on monitoring interactions of the plurality of related content viewers with the plurality of rearranged recommended content items.

11. The system as claimed in claim 10, wherein the predefined threshold is determined based, at least in part, on a total number of the plurality of recommended content items and a number of recommended content items that can be displayed on a display screen of the electronic device at a given instant.

12. The system as claimed in claim 10, wherein the system is further caused, at least in part to: access phonebook data of the content viewer from the electronic device of the content viewer, the phonebook data comprising a plurality of contacts of the content viewer; and upon determining that at least one contact from the plurality of contacts is one of a plurality of related content viewers of the viewer cohort adjust the score for each recommended content item of the plurality of recommended content items based, at least in part, on contact behavior data of the at least one contact, wherein the contact behavior data is accessed from the database.

13. The system as claimed in claim 10, wherein the system is further caused, at least in part to:
access historical content viewing data of the content viewer from the database; and
determine, the content viewer behavior data associated with the content viewer based, at least in part, on the historical content viewing data.

14. The system as claimed in claim 13, wherein the system is further caused, at least in part to:

access real-time content viewing data of the content viewer associated with a live-viewing session from the digital platform server; and dynamically update the content viewer behavior data based, at least in part, on the real-time content viewing data.

15. The system as claimed in claim 13, wherein the system is further caused, at least in part:

track interaction information associated with each of the plurality of related content viewers, the interaction information comprising click-through rates, average view duration, watch history, search terms, comments, ratings, and number of views related to each recommended content item placed at different positions on UIs of the plurality of electronic devices associated with each of the plurality of related content viewers; and determine the popularity index of each recommended content item based, at least in part, on interaction information related to each of the plurality of related content viewers.

16. A non-transitory computer-readable storage medium comprising computer-executable instructions that, when executed by at least a processor of a system, cause the system to perform a method comprising:

accessing content viewer behavior data associated with a content viewer from a database associated with the system;

classifying the content viewer in a viewer cohort from a plurality of viewer cohorts based, at least in part, on the content viewer behavior data, the viewer cohort comprising a plurality of related content viewers;

accessing and aggregating content viewer interaction data from the plurality of related content viewers in the viewer cohort, the content viewer interaction data comprising a popularity index of each recommended content item from a plurality of recommended content items that is being served on a plurality of electronic devices associated with the plurality of related content viewers by a digital platform server;

computing via a machine learning model, a performance metric for each recommended content item of the plurality of recommended content items based, at least in part, on the content viewer interaction data; and determining an optimal content sequence for displaying the plurality of recommended content items based, at least in part, on the performance metrics for the plurality of recommended content items, the optimal content sequence indicating a sequence for displaying each recommended content item of the plurality of recommended content items on an electronic device of the content viewer;

wherein computing the performance metric comprises performing a plurality of operations iteratively for a predefined threshold number of attempts, the plurality of operations comprising:

computing a score for each recommended content item of the plurality of recommended content items based, at least in part, on the content viewer interaction data and a scoring policy;

ranking each recommended content item of the plurality of recommended content items based, at least in part, on the score related to the each recommended content item and a ranking policy;

rearranging the plurality of ranked recommended content items at a predefined time interval based, at least in part, on a shuffling policy;

facilitating the display of a plurality of rearranged recommended content items on User Interfaces (UIs) of the plurality of electronic devices associated with the plurality of related content viewers; and computing and updating the content viewer interaction data from the plurality of related content viewers based, at least in part, on monitoring interactions of the plurality of related content viewers with the plurality of rearranged recommended content items.

17. A computer-implemented method, comprising:

accessing, by a system, content viewer behavior data associated with a content viewer from a database associated with the system;

classifying, by the system, the content viewer in a viewer cohort from a plurality of viewer cohorts based, at least in part, on the content viewer behavior data, the viewer cohort comprising a plurality of related content viewers;

accessing, by the system, a content library from a digital platform server, the content library including a plurality of content items;

determining and accessing, by the system, a plurality of recommended content items from the plurality of content items of the content library for the content viewer based, at least in part, on the content viewer behavior data;

computing, by the system via a machine learning model, a performance metric for each recommended content item of the plurality of recommended content items by performing a plurality of operations iteratively for a predefined threshold number of attempts, the plurality of operations comprising:

facilitating, by the system, a display of at least a set of recommended content items from the plurality of recommended content items on UIs of electronic devices for a plurality of related content viewers, accessing and aggregating, by the system, content viewer interaction data from the plurality of related content viewers in the viewer cohort in relation to the plurality of recommended content items, the content viewer interaction data comprising a popularity index of each recommended content item from a plurality of recommended content items that is being served on a plurality of electronic devices associated with the plurality of related content viewers by a digital platform server, computing, by the system, a score for each recommended content item of the plurality of recommended content items based, at least in part, on the content viewer interaction data and a scoring policy, ranking, by the system, each recommended content item of the plurality of recommended content items based, at least in part, on the score related to the each recommended content item and a ranking policy, rearranging, by the system, the plurality of ranked recommended content items at a predefined time interval based, at least in part, on a shuffling policy, facilitating, by the system, the display of a plurality of rearranged recommended content items on User Interfaces (UIs) of the plurality of electronic devices associated with the plurality of related content viewers, and computing and updating, by the system, the content viewer interaction data from the plurality of related content viewers based, at least in part, on monitoring interactions of the plurality of related content viewers with the plurality of rearranged recommended content items; and determining, by the system, an optimal content sequence for displaying the plurality of recommended content items based, at least in part, on the performance metrics for the plurality of recommended content items, the optimal content sequence indicating a sequence for displaying each recommended content item of the plurality of recommended content items on an electronic device of the content viewer.

* * * * *